US006950472B2

(12) United States Patent
Ono et al.

(10) Patent No.: US 6,950,472 B2
(45) Date of Patent: Sep. 27, 2005

(54) CODED DATA TRANSFER CONTROL METHOD AND STORAGE AND REPRODUCTION SYSTEM

(75) Inventors: Masahiro Ono, Tokyo-to (JP); Atsushi Inazumi, Tokyo-to (JP); Kazutoshi Adachi, Tokyo-to (JP); Daisuke Tanaka, Tokyo-to (JP); Hiroshi Saito, Tokyo-to (JP); Kumiko Atsuta, Tokyo-to (JP)

(73) Assignee: Pioneer Corporation, Tokyo-to (JP)

( * ) Notice: Subject to any disclaimer, the term of this patent is extended or adjusted under 35 U.S.C. 154(b) by 579 days.

(21) Appl. No.: 09/966,108

(22) Filed: Oct. 1, 2001

(65) Prior Publication Data

US 2002/0039478 A1 Apr. 4, 2002

(30) Foreign Application Priority Data

Sep. 29, 2000 (JP) .................................. P2000-300777

(51) Int. Cl.[7] .............................................. H04N 7/12
(52) U.S. Cl. .................. 375/240.24; 386/68; 348/390.1
(58) Field of Search ...................... 375/240.24, 240.28; 386/52, 68; 348/390.1; 368/52, 68

(56) References Cited

U.S. PATENT DOCUMENTS

| | | | |
|---|---|---|---|
| 5,479,303 A | | 12/1995 | Suzuki et al. |
| 5,699,117 A | * | 12/1997 | Uramoto et al. ......... 348/390.1 |
| 6,011,869 A | | 1/2000 | Ohta et al. |
| 6,453,116 B1 | * | 9/2002 | Ando et al. .................... 386/68 |
| 6,501,901 B2 | * | 12/2002 | Yasuda et al. ................ 386/52 |
| 6,580,869 B1 | * | 6/2003 | Ando et al. .................... 386/68 |

FOREIGN PATENT DOCUMENTS

WO    WO 99/65239    12/1999

OTHER PUBLICATIONS

Rangan P V et al "Continuity and Synchronization in MPEG" IEEE Journal on Selected Areas in Communications, vol. 14, No. 1, 1996, pp. 52–60.

G J Lu, H K Phung and T S Chua "Mechanisms of MPEG Stream Synchronization" Computer Communication Review, Association for Computing Machinery, New York, vol. 24 No. 1, 1994 pp. 57–67.

* cited by examiner

Primary Examiner—Gims Philippe
(74) Attorney, Agent, or Firm—Sughrue Mion, PLLC

(57) ABSTRACT

In special reproduction, pictures whose display timings are set in advance are sequentially transferred to a decoder side. When a decode start instruction is outputted during the first transfer of a picture, the second transfer of the picture is started at the transfer completion timing of the first transfer if a transfer completion timing of the second transfer comes before a transfer start timing corresponding to the display timing of a subsequent picture.

8 Claims, 18 Drawing Sheets

PESH: PES HEADER
SH: SEQUENCE HEADER
SE: SEQUENCE END CODE

CODED DATA TRANSFER CONTROL METHOD AND STORAGE AND REPRODUCTION SYSTEM

BACKGROUND OF THE INVENTION

1. Field of the Invention

The present invention relates to a coded data transfer control method for controlling a timing of a transfer operation of coded data and, more particularly, the technical field of a coded data transfer control method which controls a transfer timing of compression-coded data obtained by the MPEG2 scheme and constitutes an MPEG2 transport stream to output the MPEG2 transport stream.

2. Description of the Related Art

In recent years, digital broadcasting in which video data or audio data is digitized and multiplexed to be transmitted is becoming more popular. In the digital broadcasting, an MPEG (Moving Picture Expert Group) scheme is employed as a compression/encoding scheme. In particular, the MPEG 2 scheme, which is capable of supporting a wide range of applications and achieving data transmission with high quality and high efficiency, receives attention as a standard compression/encoding scheme in digital broadcasting. In digital broadcasting using the MPEG 2 scheme, data on a plurality of programs is multiplexed in an MPEG 2 transport stream (hereinafter, referred to as MPEG2-TS) and transmitted. A receiving system for receiving the data is configured to selectively extract desired data. In this storage and reproduction system, arbitrary coded data included in the MPEG2-TS stored in a storage device is transferred at a predetermined timing and controlled such that the transferred coded data is decoded and displayed at a predetermined timing, so that video data can be reproduced under desired conditions.

In the meantime, in the case where video data stored in a storage device is reproduced in the storage and reproduction system, it is desirable that a special reproduction processing function supporting fast forward winding or rewinding is provided. The video data multiplexed on the MPEG2-TS is comprised of a large number of pictures, and the respective pictures function as access units to be accessed in normal reproduction and random reproduction. Therefore, in reproduction, picture data to be displayed must be specified, and the picture data must be sequentially transferred to an MPEG2 decoder at transfer timings conforming to reproduction. In particular, in special reproduction, picture data to be displayed must be specified, and the picture data must be sequentially transferred to the MPEG2 decoder at transfer timings conforming to special reproduction.

However, in a transfer operation of MPEG2 picture data, after transfer is started, all picture data are inputted to a buffer on the decoder side, a certain period of time is required until decoding and display of the picture data are completed. On the other hand, with respect to the respective picture data, display timings corresponding to reproduction are set. As described above, since a certain period of time is required to perform the transfer operation, the picture data may be behind the display timing of the predetermined picture data. Therefore, a blank period until the first picture is displayed after reproduction is started becomes long, a person who watches the reproduced image feels incompatibility disadvantageously.

SUMMARY OF THE INVENTION

The present invention has been made in consideration of the above problems, and has as its object to provide a coded data transfer control method or the like which can minimize a blank period until an access unit is displayed after transfer is started when access units of coded data the display timing of which is set are sequentially transferred, and which can control a transfer timing to perform a rapid display process.

The above object of the present invention can be achieved by a coded data transfer control method of the present invention which transfers coded data to a decoding device by every access unit, which is a unit of access in reproduction, and controls transfer operations such that the timings of said transfer operations are appropriate to display timings respectively set for the access units. The method is provided with the processes of: determining a timing at which a transfer operation is to be completed when a predetermined access unit is continuously transferred after the predetermined access unit is to be transferred; and repeatedly transferring the predetermined access unit to the decoding device if the determined timing is before a timing at which a transfer operation corresponding to the display timing set for a subsequent access unit is to be started.

According to the present invention, when an access unit which is being transferred is transferred again in transfer control of coded data, control is performed such that the access unit is repeatedly transferred only when the transfer can be completed until a transfer start timing appropriate to a display timing of a subsequent access unit. Therefore, by effectively using time to spare of a transfer operation of each access unit, transfer is performed a plurality of times. For this reason, the present invention can realize a transfer control method which can further shorten a blank period until a display of coded data is started immediately after reproduction is started is shortened, and can perform a rapid display process.

The above object of the present invention can be achieved by a coded data transfer control method of the present invention which transfers coded data to a decoding device by every access unit, which is a unit of access in reproduction, and controls transfer operations such that the timings of said transfer operations are appropriate to display timings respectively set for the access units. The method is provided with the processes of: determining a timing at which a transfer operation is to be completed when a predetermined access unit is continuously transferred after the predetermined access unit is to be transferred; and repeatedly transferring the predetermined access unit to the decoding device if the determined timing is before the display timing set for a subsequent access unit.

According to the present invention, when an access unit which is being transferred is transferred again in transfer control of coded data, control is performed such that the access unit is repeatedly transferred only when the transfer can be completed until a display timing of a subsequent access unit. Therefore, by effectively using time to spare of a transfer operation of each access unit, while a small offset of the display timing is allowed, transfer is performed a plurality of times frequently as much as possible. For this reason, the present invention can realize a transfer control method which can further shorten a blank period until a display of coded data is started immediately after reproduction is started is further shortened, and can perform a more rapid display process.

In one aspect of the present invention, said process of repeatedly transferring the predetermined access unit includes a process of reading an access unit to be transferred from a storage device in which the coded data is stored, and transfers the access unit to the decoding device.

According to this aspect, coded data to be transferred is stored in the storage device in advance, after the coded data is read from the storage device in transfer of an access unit, the transfer operation is performed. For this reason, a rapid display process can be performed while selection of an access unit and setting a transfer timing freely performed.

In another aspect of the present invention, said process of repeatedly transferring the predetermined access unit includes a process of selectively determining the access unit to be transferred on the basis of auxiliary information including recording position information of the access unit in the storage device.

According to this aspect, coded data to be transferred is stored in the storage device in advance, after an access unit determined on the basis of the auxiliary information is read from the storage device, the transfer operation is performed. For this reason, access units can be uniformly determined on the basis of the auxiliary information, and a rapid display process can be performed while an access unit is more easily read in accordance with special reproduction.

In further aspect of the present invention, when a reproduction command for a predetermined reproduction condition is received, said process of repeatedly transferring the predetermined access unit transfers the access unit in form of a reproduction transport stream with control information.

According to this aspect, when a reproduction command of, e.g., special reproduction or the like is received in transfer control of coded data, after an access unit is read from the storage unit, a reproduction transport stream is constituted by adding control information to the access unit, and the transfer operation is performed. Therefore, an access unit is selectively transferred as described above from the reproduction transport stream on which the coded data is multiplexed, and control of a special reproduction process or the like can be easily realized.

In further aspect of the present invention, said process of repeatedly transferring the predetermined access unit includes a process of adding the control information to the reproduction transport stream, wherein the control information includes time reference information of a program included in the transport stream and reproduction time information for regulating time at which the access unit to be reproduced.

According to this aspect, when the reproduction transport stream is transferred, the time reference information of the program and the reproduction time information can be used as references of various timings. For this reason, a transfer timing or a decoding/display timing appropriate to reproduction conditions are accurately set every access unit, time management adapted to special reproduction or the like can be performed.

The above object of the present invention can be achieved by a storage and reproduction system of the present invention which performs a storage process and a reproduction process of a transport stream on which coded data is multiplexed. The system is provided with: a storage device for storing coded data; a timing determining device for determining a timing at which a transfer operation is to be completed when a predetermined access unit is continuously transferred after the predetermined access unit is to be transferred; and a transferring device for repeatedly transferring the predetermined access unit to a decoding device if the determined timing is before a timing at which a transfer operation corresponding to the display timing set for a subsequent access unit is to be started, wherein said transferring device is provided with: an access unit determining device for determining the access unit to be transferred on the basis of auxiliary information including recording position information of the access unit in the storage device; a reading device for reading an access unit to be transferred from the storage device in which the coded data is stored; and a generating device for generating a reproduction transport stream including a plurality of the read access unit with control information.

According to the present invention, the transfer control method is applied to a storage/reproduction system, so that a storage and reproduction system which performs a rational decoding/display process to a reproduction transport stream can be realized.

In one aspect of the present invention, said transferring device is further provided with an adding device for adding the control information to the reproduction transport stream, wherein the control information includes time reference information of a program included in the transport stream and reproduction time information for regulating time at which the access unit to be reproduced.

According to this aspect, when the reproduction transport stream is transferred, the time reference information of the program and the reproduction time information can be used as references of various timings. For this reason, a transfer timing or a decoding/display timing appropriate to reproduction conditions are accurately set every access unit, time management adapted to special reproduction or the like can be performed in the system.

DETAILED DESCRIPTION OF THE PREFERRED EMBODIMENTS

Preferred embodiments of the present invention will be described below with reference to the accompanying drawings. In the embodiments, a case in which the present invention is applied to a storage and reproduction system having a special reproduction process function will be described below.

Figure 1:
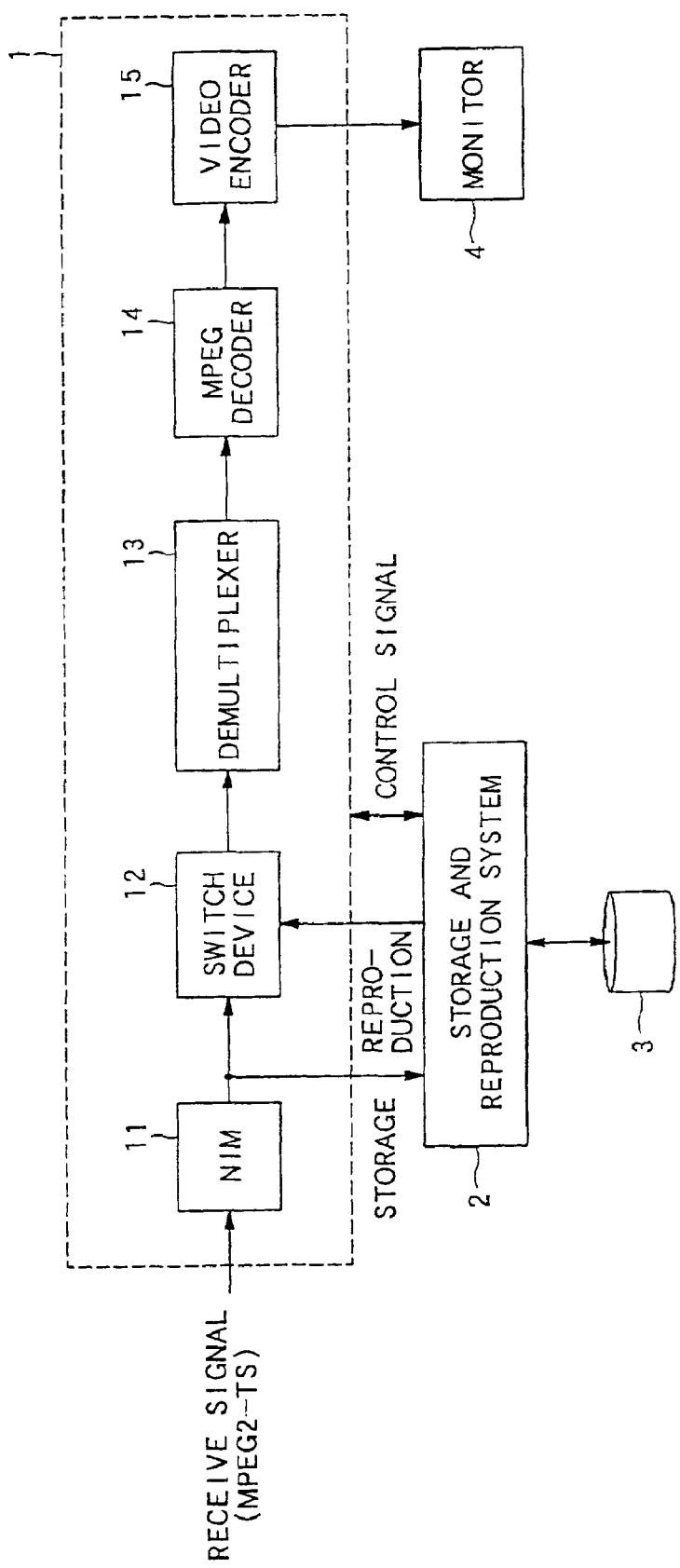
FIG. 1 is a block diagram showing an entire configuration of a digital broadcast receiving system according to an embodiment of the present invention.

FIG. 1 is a block diagram showing an entire configuration of a digital broadcast receiving system that contains a storage and reproduction system according to the present invention. The digital broadcast receiving system shown in FIG. 1 is provided with: a digital broadcast receiving unit 1 for receiving an MPEG2-TS delivered as a digital broadcast; a storage and reproduction system 2 for controlling storage processing and reproduction processing of the received MPEG2-TS; a storage medium 3 serving as a storage device of the MPEG2-TS; and a monitor 4 serving as a device for displaying an image displayed and outputted based on the MPEG2-TS.

In FIG. 1, the digital broadcast receiving unit 1 is provided with: an NIM (Network Interface Module) 11; a switch device 12; a demultiplexer 13; an MPEG decoder 14; and a video encoder 15. In the above configuration, the NIM 11 applies decode processing/error correction processing to a digital broadcast receive signal received from the outside via a network, and extracts the MPEG2-TS in real time. The MPEG2-TS in the present embodiment is composed of a plurality of digital broadcast programs, and the corresponding stream is configured to be multiplexed. In addition, as a receive signal received at the NIM 11, for example, there are employed a variety of modes such as digital broadcast signal transmitted from a satellite broadcast via radio waves.

The MPEG2-TS outputted from the NIM 11 are supplied to each of the switch device 12 and the storage and reproduction system 2. That is, the MPEG2-TS is delivered from the NIM 11 via the switch device 12, whereby a digital broadcast can be displayed as an image in real time, and a desired MPEG2-TS can be stored in the storage medium 3 by means of the storage and reproduction system 2.

The switch device 12 outputs either one of MPEG2-TS from the NIM 11 and reproduction MPEG2-TS reproduced in the storage and reproduction system 2 by selectively switching it. At this time, a user makes predetermined operation for an operating device (not shown), whereby the user can selectively set the MPEG2-TS from the NIM 11 and a reproduction MPEG—TS from the storage and reproduction system 2.

The demultiplexer 13 extracts data on a program having a specific program number set thereto, out of a plurality of programs multiplied for the MPEG2-TS or separates video data or audio data configuring a respective one of these programs for each component, and outputs the extracted coded data.

In the present embodiment, the MPEG 2 scheme is employed as a data compression/encoding scheme. Thus, the MPEG decoder 14 applies decompression processing in accordance with the MPEG 2 scheme to coded data outputted from the demultiplexer 13. Then, the decompressed data outputted from the MPEG decoder 14 is converted into a determined format by means of the video encoder 15, and is outputted to be displayed on the externally connected monitor 4 to configure a display image.

In FIG. 1, the digital broadcast receiving unit 1 and the storage and reproduction system 2 are configured so that a predetermined control signal can be received/transmitted in order to mutually deliver an operating command or acquire an operating state. Control signals delivered to the storage and reproduction system 2 in accordance with a user's operation made at the digital broadcast receiving unit 1 include: a storage command signal for instructing the storage medium 3 to store the MPEG2-TS; a normal reproduction command signal for instructing a normal reproduction operation of the MPEG2-TS recorded in the storage medium 3; and a special reproduction command signal for instructing a special reproduction operation of the MPEG2-TS recorded in the storage medium 3.

Figure 2:
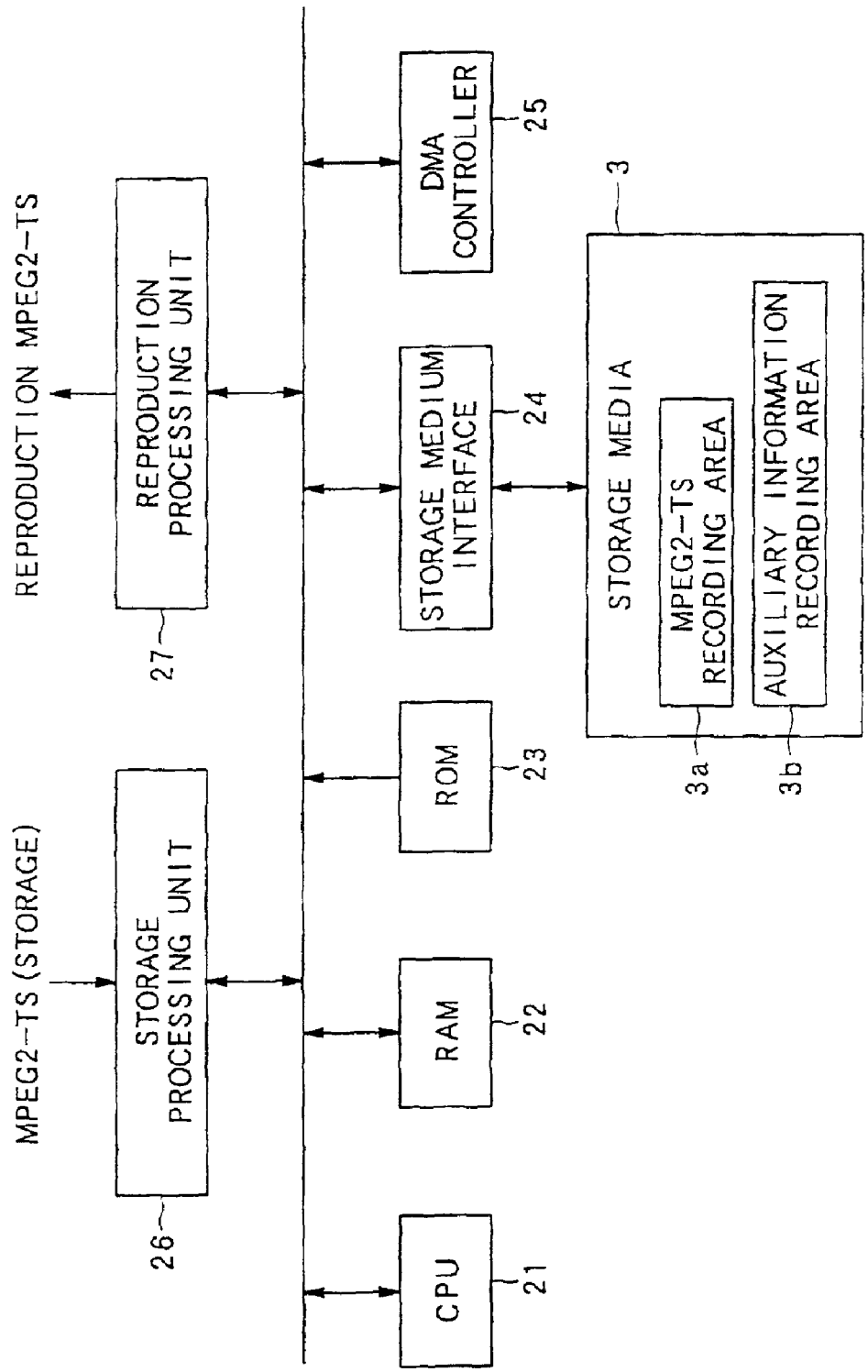
FIG. 2 is a block diagram showing a schematic configuration of a storage and reproduction system in the digital broadcast receiving system.
Figure 3:
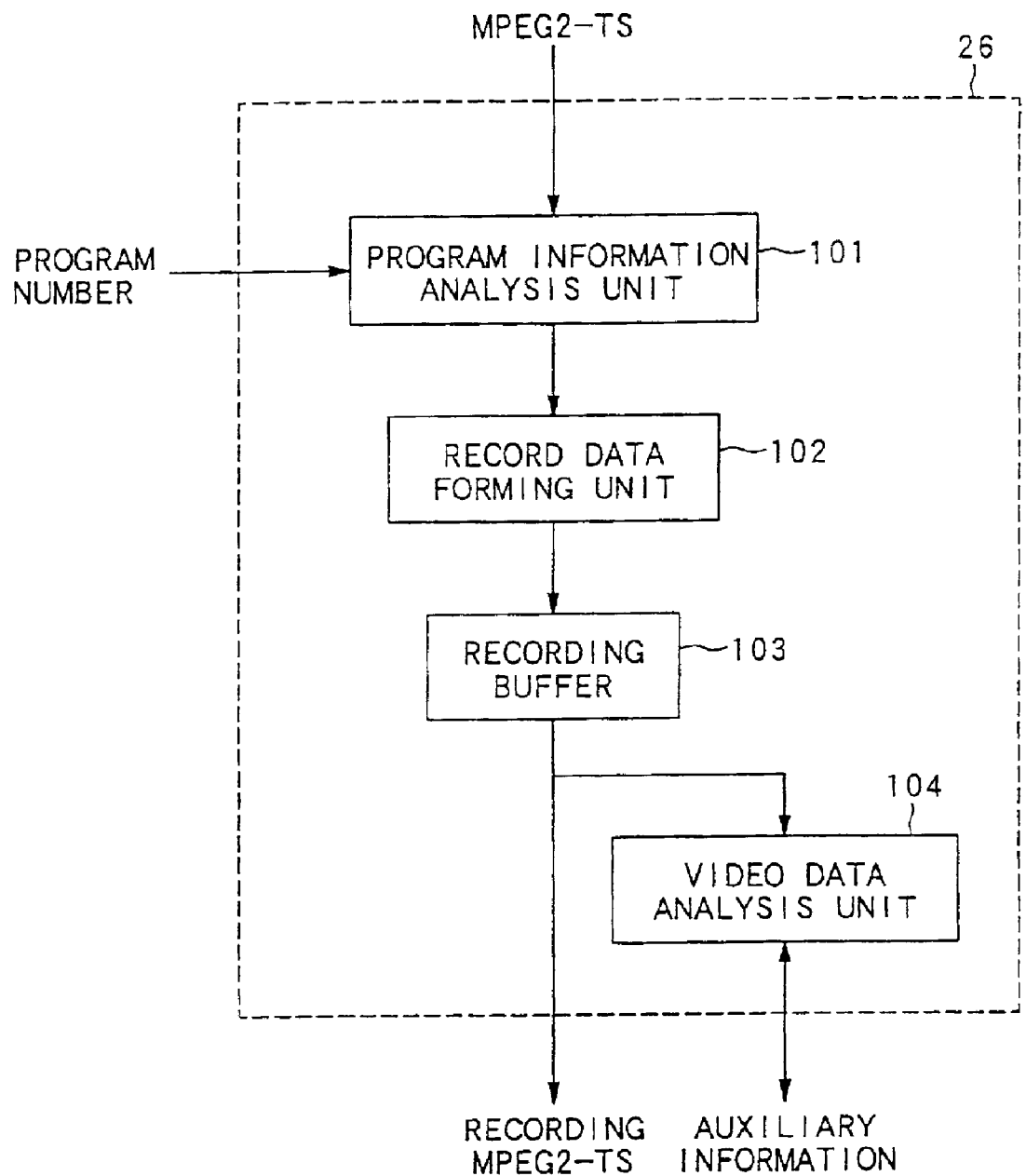
FIG. 3 is a block diagram showing a configuration of a storage processing unit of the storage and reproduction system.
Figure 4:
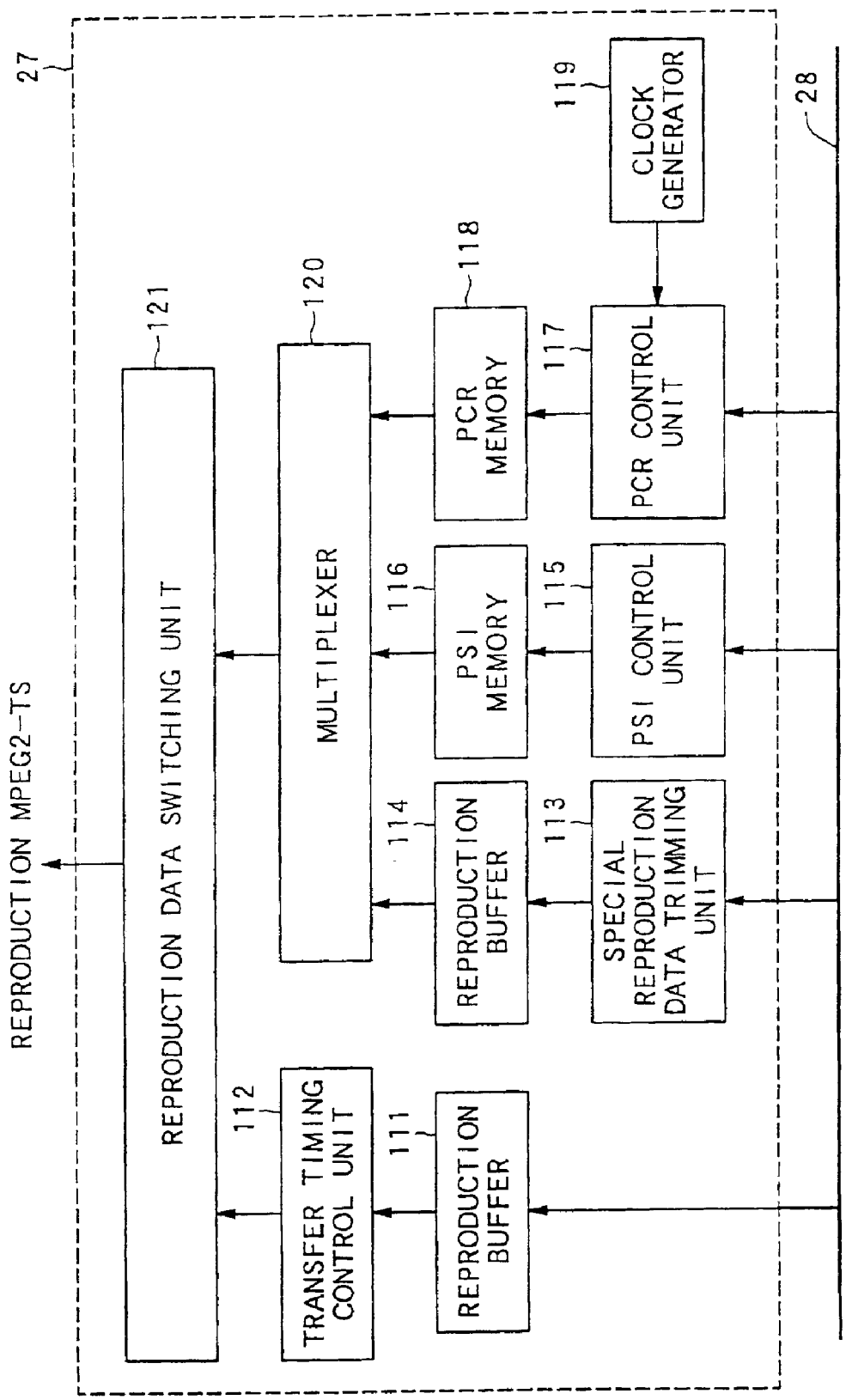
FIG. 4 is a block diagram showing a configuration of a reproduction processing unit of the storage and reproduction system.

Now, a schematic configuration of a storage and reproduction system 2 in the above digital broadcast receiving system, will be described with reference to FIG. 2 to FIG. 4. FIG. 2 is a block diagram showing a schematic configuration of the storage and reproduction system 2. In addition, FIG. 3 is a block diagram showing a configuration of a storage processing unit 26 of the components contained in the storage and reproduction system 2 shown in FIG. 2. FIG. 4 is a block diagram showing a configuration of a reproduction processing unit 27.

As shown in FIG. 2, the storage and reproduction system 2 according to the present embodiment is provided with: a CPU 21; a RAM 22; a ROM 23; a storage medium interface 24 connected to a storage medium 3; a DMA controller 25; a storage processing unit 26; a reproduction processing unit 27; and a bus 28.

In the configuration shown in FIG. 2, the CPU 21 controls an operation of the entire storage and reproduction system 2. The CPU 21 reads out and executes a control program recorded in the ROM 23, and carries out control while data required for processing is temporarily maintained in the RAM 22. Then, the CPU 23 delivers a control signal to each component of the storage and reproduction system 2 via the bus 28.

The storage processing unit 26 analyzes the MPEG2-TS outputted from the NIM 11 shown in FIG. 1, analyzes the MPEG2-TS that corresponds to a program targeted for storage, and carries out storage processing for the storage medium 3. Referring now to FIG. 3, a specific configuration of the storage processing unit 26 will be described here.

As shown in FIG. 3, the storage processing unit 26 is provided with: a program information analysis unit 101; a record data forming unit 102; a recording buffer 103; and a video data analysis unit 104.

In the above configuration, the program information analysis unit 101 analyzes a program configuration multiplexed in the inputted MPEG2-TS, and acquires the analysis result as program information. At this time, the program information analysis unit 101 extracts a PID (Packet Identifier) provided as identification information of TS packet described later, which comprises the MPEG2-TS. Individual streams contained in MPEG2-TS can be determined based on the PID provided to the TS packet.

The record data forming unit 102 selectively extracts and outputs a data portion of the specific program from MPEG2-

TS in order to form record data relevant to a specific program having a predetermined program number in the MPEG2-TS. At this time, a time stamp as an arrival time information is affixed to a head portion relevant to each TS packet comprising the MPEG2-TS as record data. This time stamp is utilized for time management when a variety of processing functions are carried out in the storage and reproduction system 2.

The recording buffer 103 is a storage device for buffering the MPEG2-TS that is record data outputted from the record data forming unit 102. Record data is read out from the recording buffer 103 at a predetermined timing, and the read out data is transferred to the storage medium 3.

The video data analysis unit 104 analyzes a selected video component from among MPEG—TS maintained in the recording buffer 103, acquires information required for reproducing a desired video access unit (VAU), and generates and outputs auxiliary information based on the acquired information. Here, the video access unit is a unit of decoding and reproduction, and generally, corresponds to 1 picture data. In addition, the auxiliary information employed in the present embodiment contains trick VAU auxiliary information described later, which is utilized for special reproduction. In the present embodiment, a video access unit employed for special reproduction such as rewinding or fast forward winding is referred to as trick VAU. Specific analysis processing at the video data analysis unit 104 will be described later in detail.

Next, in FIG. 2, a reproduction processing unit 27 carries out reproduction processing of MPEG2-TS stored in the storage medium 3, and configures and outputs reproduction MPEG2-TS targeted for reproduction. Referring now to FIG. 4, a specific configuration of the reproduction processing unit 27 will be described here.

As shown in FIG. 4, the reproduction processing unit 27 is provided with: a reproduction buffer 111; a transfer timing control unit 112; a special reproduction data trimming unit 113; a reproduction buffer 114; a PSI control unit 115; a PSI memory 116; a PCR control unit 117; a PCR memory 118; a clock generator 119; a multiplexer 120; and a reproduction data switching unit 121.

In the above configuration, the reproduction buffer 111 is a storage device for buffering the MPEG2-TS targeted for reproduction, read out from the storage medium 3 during normal reproduction. In addition, the transfer timing control unit 112 carries out timing control for outputting the MPEG2-TS maintained in the reproduction buffer 111, and outputs the MPEG2-TS to be reproduced when a reproduction timing arrives. The reproduction buffer 111 and the transfer timing control unit 112 correspond to a path of MPEG2-TS when a normal reproduction command signal is received.

The specific reproduction data trimming unit 113 selectively reads out a video access unit and sequence header data described later from the storage medium 3 in accordance with trick VAU auxiliary information concerning a target for specific reproduction, and applies trimming processing for generating a TS packet string reconfigured for special reproduction. In addition, the reproduction buffer 114 is a storage device for buffering a TS packet string for special reproduction outputted from the special reproduction data trimming unit 113. The special reproduction data trimming unit 113 and the reproduction buffer 114 correspond to a path of MPEG2-TS when a special reproduction command signal is received. A specific processing function and configuration of the specific reproduction data trimming unit 113 will be described later in detail.

The PSI control unit 115 generates PSI (Program Specific Information) that is program configuration information described in a packet, and controls the generated information so as to be delivered to be included in part of the MPEG2-TS. For the PSI, table information representing a relationship between program components is specified. For example, the PSI includes a PAT (Program Association Table) that is a table that describes a MPEG2-TS program configuration or a PMT (Program Map Table) that describes information such as PID that is a component configuring each program. The PSI memory 116 temporarily maintains the PSI outputted from the PSI control unit 115 until a delivery timing has arrived.

The PCR control unit 117 generates a PCR (Program Clock Reference) as program time reference information, and controls the generated information so as to be delivered to be included in part of the MPEG2-TS at a predetermined timing. A 27 MHz system clock is supplied from the clock generator 119 to the PCR control unit 117, and a predetermined time on a time axis of STC (System Time Clock) that is a reference for synchronization is assigned. Then, the PCR memory 118 temporarily maintains the PCT outputted from the PCR control unit 117 until a delivery timing has arrived.

The multiplexer 120 arbitrates a delivery timing of: a TS packet string maintained in the reproduction buffer 114; the PCI maintained in the PSI memory 116; and PCR maintained in the PCR memory 118, respectively, and configures continuous MPEG2-TS. At this time, in the multiplexer 120, a priority when the respective delivery timings are coincided is set. Specifically, the priority of the PCR output is set to be the highest.

The reproduction data switching unit 121 selectively switches either one of the MPEG2-TS from the transfer timing control unit 112 and MPEG2-TS from the multiplexer 120, and outputs reproduction MPEG2-TS to the digital broadcast receiving unit 1. That is, in executing reproduction processing employing record data on the storage medium 3, when a normal reproduction command signal is received, the reproduction data switching unit 121 switches MPEG2-TS to that of the transfer timing control unit 112. When a special reproduction command signal is received, the reproduction data switching unit 121 switches MPEG2-TS to that of the multiplexer 120.

Now, turning to FIG. 2, a storage medium interface 24 carries out an interface operation when a variety of data are read out from or written into the storage medium 3. In the present embodiment, a hard disk that is a storage device with a large capacity, for example, is employed as the storage medium 3. In addition, a DMA controller 25 controls a DMA (Direct Memory Access) transfer operation when record data is transferred between each buffer of the storage and reproduction system 2 and the storage medium 3 via the bus 28.

Figure 5:
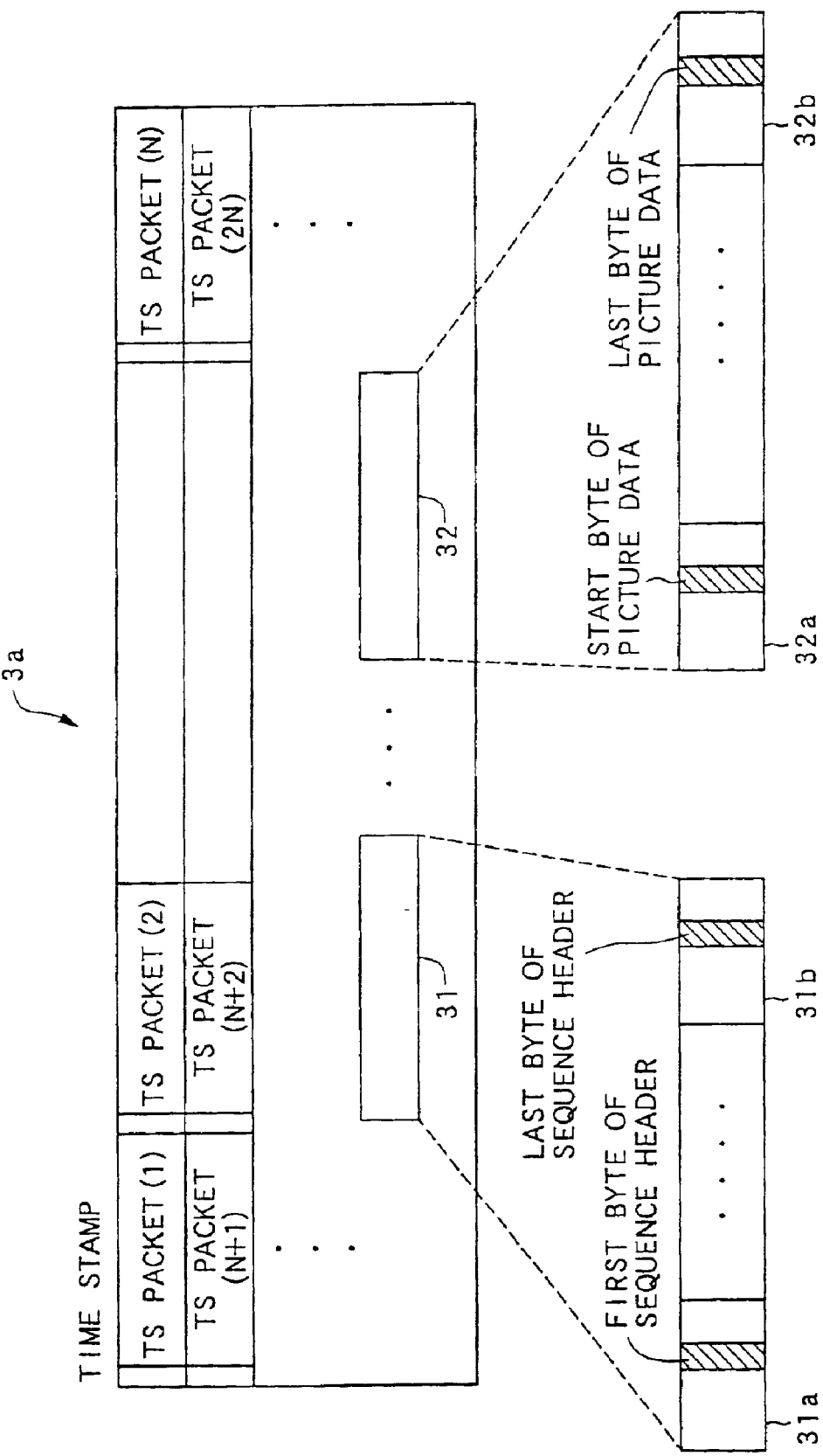
FIG. 5 is a diagram showing a recording format when an MPEG2-TS is recorded in a storage medium.

Now, referring now to FIG. 5 and FIG. 6, a recording format of the storage medium 3 in the present embodiment will be described here. FIG. 5 is a diagram showing a recording format when MPEG2-TS processed by the storage processing unit 26 is recorded in the storage medium 3. As shown in FIG. 5, MPEG2-TS to be recorded in the storage medium 3 is handled while a TS packet is defined as a data unit. Respective TS packets have a fixed data length of 188 bytes, and have a data structure in accordance with a predetermined format.

As shown in FIG. 5, in an MPEG2-TS recording area 3*a* of the storage medium 3, a plurality of TS packets each having logical or physical packet numbers are sequentially arranged. A time stamp is added to the head portion of each TS packet, as described above. By referring to this time stamp, the relative transmission timing of each TS packet in the received original MPEG2-TS can be determined. In addition, the main body portion of the TS packet includes video data or audio data in a subdivided form for each program.

In addition, in FIG. 5, a video sequence that is a data unit in a MPEG 2 hierarchical structure is configured over a plurality of continuous TS packets. The video sequence in the MPEG 2 includes one or more video frames, starting with a sequence header having a parameter for decoding/reproducing these video frames, and terminating with a sequence end code. A plurality of sequence headers can be inserted between the sequence header and the sequence end code.

The MPEG2-TS recording area 3a includes: a picture data recording area 32 in which a plurality of TS packets including specific picture data is recorded; and a sequence header recording area 31 in which a plurality of TS packets including proximal sequence header data preceding the picture data are recorded. In FIG. 5, although there are shown the picture data recording area 32 and the sequence header recording area 31 one by one, a plurality of the picture data recording areas 32 and sequence header recording areas 31 in such a relationship exist in the actual MPEG2-TS recording area 3a. In addition, the sequence header recording area 31 may include extension data in an MPEG sequence layer required for decoding/displaying picture data in addition to sequence header data. Hereinafter, a description will be given by showing an example when only sequence header data is contained.

As shown at the lower part of FIG. 5, in the sequence header recording area 31, sequence headers are recorded from a sequence-header-starting-byte stored at a position that has an offset from the recording position of the starting byte in the starting TS packet 31a, to the sequence-header-final-byte recorded at a position that has an offset from the recording position of the starting byte in the last TS packet 31b.

In addition, in the picture data recording area 32, picture data corresponding to a predetermined video access unit is recorded from a picture-data-starting-byte recorded at a position that has an offset from the recording position of the starting byte in the starting TS packet 32a, to picture-data-final-byte recorded at a position that has an offset from the recording position of the starting byte in the last TS packet 32b.

Figure 6:
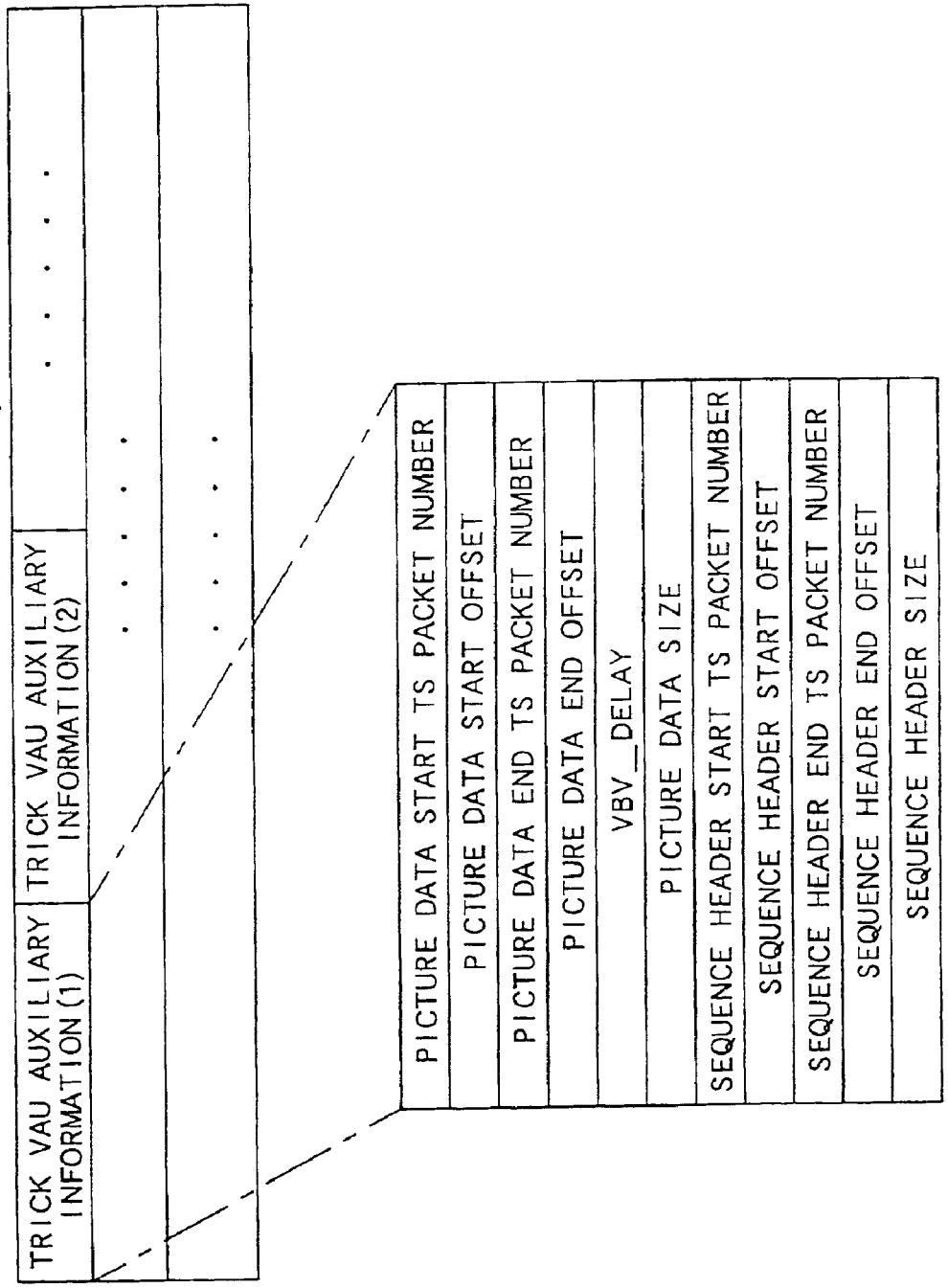
FIG. 6 is a diagram showing a data structure of a VAU auxiliary information recorded in an auxiliary information recording area for the storage medium.

FIG. 6 is a diagram showing a data structure of trick VAU auxiliary information recorded in the auxiliary information recording area 3b of the storage medium 3. As described above, in the recording format shown in FIG. 5, in the case where a video access unit including an I picture employed for special reproduction is recorded, the trick VAU auxiliary information extracted by means of the video data analysis unit 104 is recorded in the auxiliary information recording area 3b. That is, the trick VAU auxiliary information is information that is referred to in order to judge a recording state of the trick VAU into the MPEG2-TS recording area 3a.

As shown in FIG. 6, the trick VAU auxiliary information corresponding to each video access unit for special reproduction is sequentially arranged in the auxiliary information area 3b of the storage medium 3 while numbers are provided respectively. The trick VAU auxiliary information is comprised of information concerning picture data and information concerning a sequence header, as shown at the lower part of FIG. 6.

Of the trick VAU auxiliary information, the information concerning picture data includes:
a picture-data-start-TS-packet-number;
a picture-data-start-offset;
a picture-data-end-TS-packet-number;
a picture-data-end-offset;
a picture-data-size; and vbv_delay described later.

Taking the data structure shown in FIG. 5 for example, the picture-data-start-TS-packet-number indicates a number that is assigned to the TS packet 32a at the beginning of a predetermined picture data recording area 32. In addition, the picture-data-start-offset indicates an offset value of a recording position of a picture-data-starting-byte included in the above TS packet 32a. In addition, the picture-data-end-TS-packet-number indicates a number that is assigned to the last TS packet 32b. In addition, the picture-data-end-offset indicates an offset value at the recording position of the picture-data-final-byte included in the above TS packet 32b. In addition, the picture-data-size corresponds to a data size of picture data recorded in the picture data recording area 32.

Further, of the trick VAU auxiliary information, the information concerning a sequence header includes:
a sequence-header-start-TS-packet-number;
a sequence-header-start-offset;
a sequence-header-end-TS-packet-number;
a sequence-header-end-offset;
and a sequence header size.

Taking the data structure shown in FIG. 5 for a example, the sequence-header-start-TS-packet-number indicates a number that is assigned to a TS packet 31 a at the beginning of a predetermined sequence header recording area 31. In addition, the sequence-header-start-offset indicates an offset value at the recording position of a sequence-header-starting-byte included in the above TS packet 31a. In addition, the sequence-header-end-TS-packet-number indicates a number that is assigned to the last TS packet 31b. In addition, the sequence-header-end-offset indicates an offset value at the recording position of the sequence-header-final-byte included in the above TS packet 31b. In addition, the sequence-header-size corresponds to a data size of a sequence header recorded in the sequence header recording area 31.

Further, vbv_delay of the trick VAU auxiliary information is a parameter that expresses by time a storage quantity of a vertical input buffer in decoding a video access unit for special reproduction. By referring to this vbv_delay, a decode timing of a specific video access unit can be determined. In the present embodiment, during special reproduction, processing for rewriting vbv_delay is carried out so as to be adaptive to a picture data decode timing. A detailed description will be given later.

Figure 7:
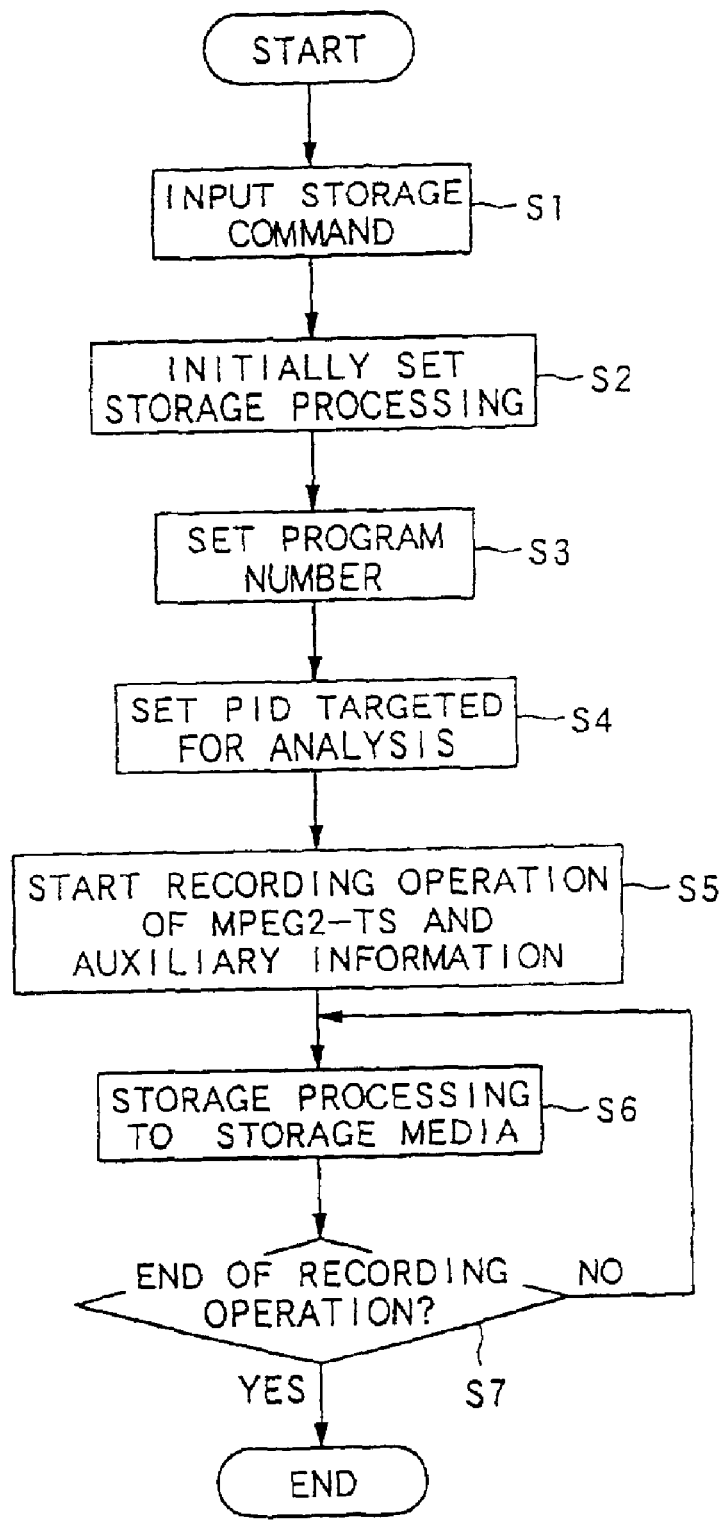
FIG. 7 is a flow chart illustrating storage processing carried out in the storage and reproduction system.
Figure 8:
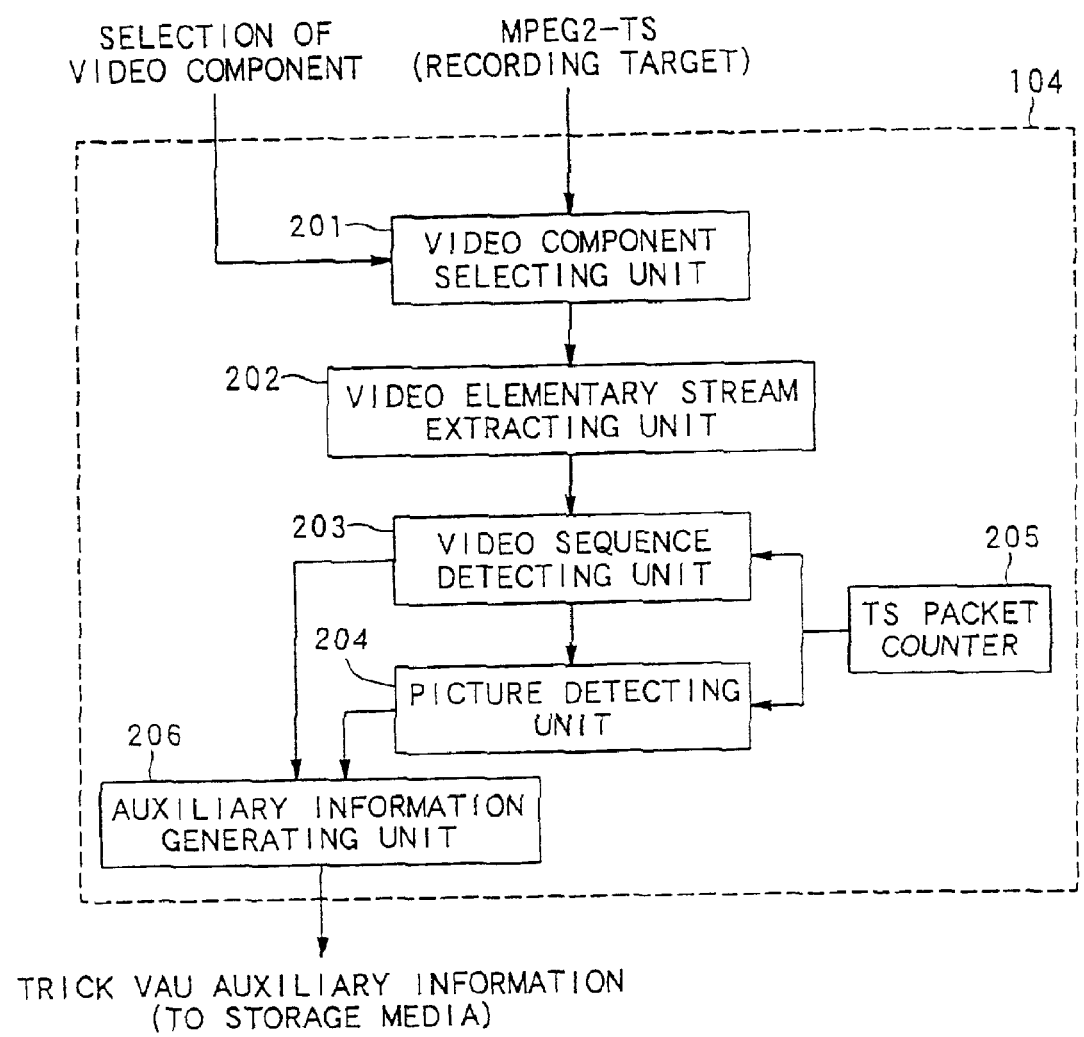
FIG. 8 is a functional block diagram showing a video data analysis unit contained in the storage processing unit.

Now, storage processing carried out at the storage and reproduction system 2 will be described with reference to FIG. 7 and FIG. 8. FIG. 7 is a flow chart showing storage processing when the MPEG2-TS of a predetermined program received in a digital broadcast system is stored in the storage medium 3. FIG. 8 is a functional block diagram showing a video data analysis unit 104 of a storage processing unit 26.

In the processing shown in FIG. 7, when a storage command is inputted with respect to a specific program (step S1), the subsequent storage processing is started. For example, when a program is specified by the user's operation, and a record button or the like is pressed, the corresponding storage command signal is delivered to the CPU 21 via the bus 28. The monitoring of the storage command signal at the step S1 is continuously carried out.

After storage command entry, initial settings required for recording the MPEG2-TS and trick VAU auxiliary information that corresponds to a program of the set program number are carried out (step S2). For example, a recording area in the storage medium 3 is allocated or a file for writing record data is provided.

Next, a program number of a program to be recorded is set at a program information analysis unit 101 (step S3). In this manner, at the program information analysis unit 101, a program targeted for recording is specified, and the data structure can be analyzed.

Next, of the MPEG2-TS analyzed at the program information analysis unit 101, the PID relevant to a stream to be stored is set as an analysis target of the video data analysis unit 104 (step S4). The PID to be set to the program information analysis unit 101 can be determined by referring to the PSI contained in the MPEG2-TS. In this manner, in the video data analysis unit 104, it is possible to analyze a video elementary stream described later based on the PID, thereby generating trick VAU auxiliary information.

Next, an operation for recording MPEG2-TS and auxiliary information that corresponds to a program targeted for recording into the storage medium 3 is started (step S5). The MPEG2-TS is outputted from the recording buffer 103, and is written into the MPEG2-TS recording area 3a. The auxiliary information is outputted from the video data analysis unit 104, and is written into an auxiliary information recording area 3b. Then, storage processing for the storage medium 3 is sequentially carried out sequentially (step S6). In the case where a recording operation terminates (step S7: YES), the storage processing shown in FIG. 7 is terminated. In the case where a recording operation does not terminate yet (step S7: NO), processing reverts to the step S6 at which storage processing is continued.

As shown in the functional block diagram of FIG. 8, the video data analysis unit 104 contained in the storage processing unit 26 is provided with: a video component selecting unit 201; a video elementary stream extracting unit 202; a video sequence detecting unit 203; a picture detecting unit 204; a TS packet counter 205; and an auxiliary information generating unit 206.

In the above configuration, the video component selection unit 201 selects as an analysis target a TS packet that coincides with a specified video component of the MPEG2-TS, which is targeted for recording and inputted to the video data analysis unit 104. The video component corresponds to a TS packet string that configures a specified stream of the selected program, and is identified by PID. Then, in the case where the video component is indicated in accordance with the user's operation or in the case where a program configuration of the received digital broadcast is updated, a change is made at a predetermined timing. A change of the video component caused by an elapse of time is indicated for the video component selecting unit 201 immediately.

Next, the video elementary stream extracting unit 202 analyzes a packet structure of TS packet group obtained from the video component selection unit 201, and extracts a video elementary stream that should be targeted for analysis.

The video sequence extracting unit 203 detects a video sequence that is a hierarchical structure of the MPEG 2, as described above, from the video elementary stream extracted at the video elementary stream extracting unit 2. Then, recording position information on a sequence header disposed as shown in FIG. 5 is determined, and the determined information is outputted as a component of the trick VAU auxiliary information. At this time, a number assigned to a TS packet being processed (refer to FIG. 5) is inputted from a TS packet counter 205 in the video sequence detecting unit 203, and the correlation between the inputted number and a video sequence can be identified.

The picture detecting unit 204 further detects picture data that corresponds to an I picture. In this case as well, the recording position information on picture data that corresponds to disposition as shown in FIG. 5 is determined, and the determined information is outputted as a component of the trick VAU auxiliary information. To the picture detecting unit 204 as well, a number assigned to a TS packet is inputted from the above described TS packet counter 205.

The auxiliary information generating unit 206 integrates trick VAU auxiliary information outputted from each of the video sequence detecting unit 203 and picture detecting unit 204, and generates the trick VAU auxiliary information shown in FIG. 6 to output it. That is, a data string composed of each item of information concerning a sequence header and each item of information concerning picture data is delivered to the storage medium 3, and the delivered data string is written into the auxiliary information recording area 3b.

Figure 9:
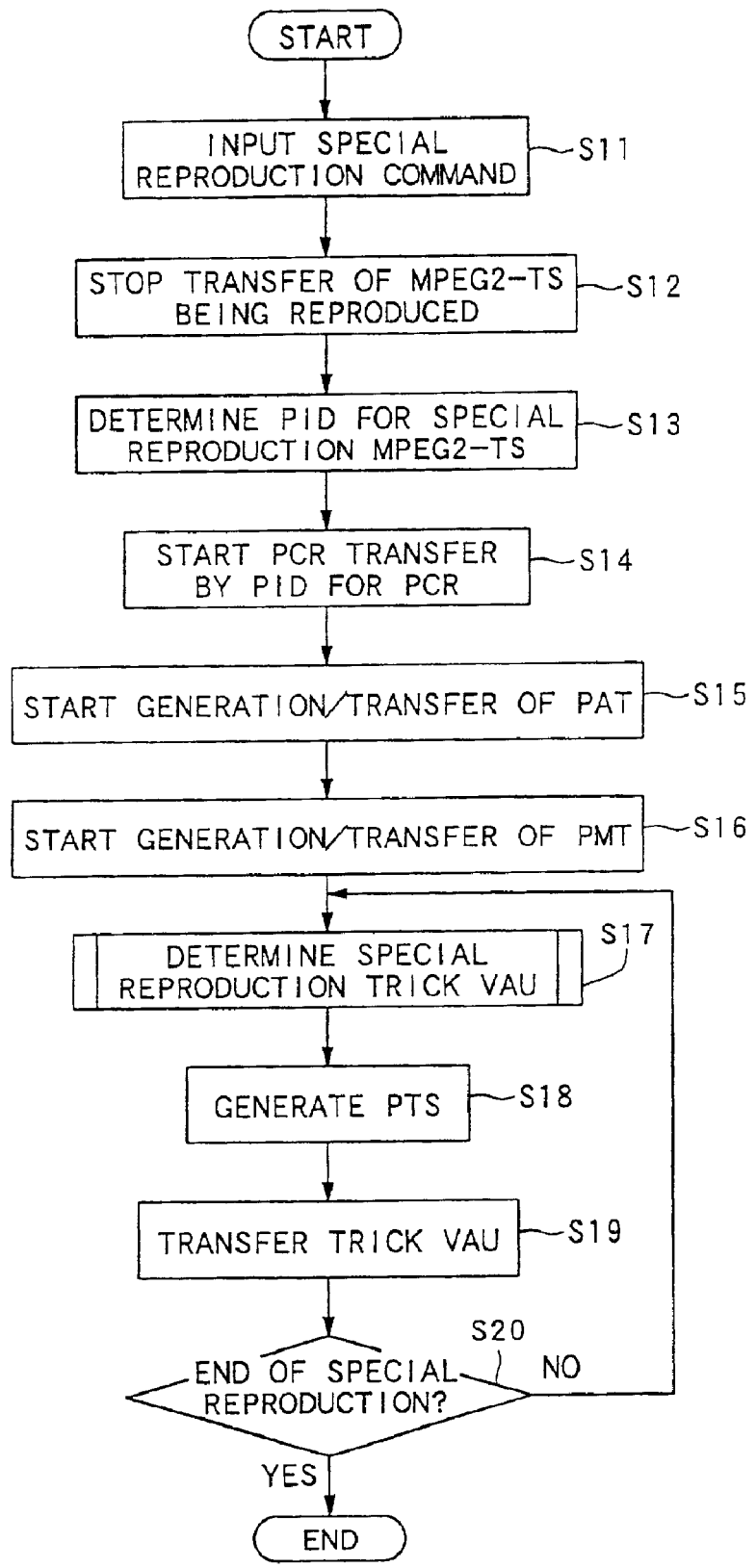
FIG. 9 is a flow chart illustrating special reproduction processing carried out in a storage and reproduction system.

Now, special reproduction processing carried out in the storage and reproduction system 2 will be described with reference to FIG. 9. FIG. 9 is a flow chart showing a case in which special reproduction processing such as fast forward winding or rewinding is executed while MPEG2-TS recorded in the storage medium 3 is reproduced.

In FIG. 9, when a special reproduction command is inputted during reproduction (step S11), the subsequent special reproduction processing is started. For example, when a fast forward winding or rewinding function button is pressed at a predetermined timing by the user's operation during reproduction, the corresponding reproduction command signal is delivered to the CPU 21 via the bus 28. Subsequently, an operation for transferring the MPEG2-TS2 from the storage medium 3 being reproduced to the reproduction processing unit 27 is stopped (step S12).

Next, a PID assigned to an MPEG2-TS targeted for special reproduction is determined (step S13). At the step S13, it is required to determine the video component PID for specifying a target for special reproduction, a PID for PCR employed for a time reference, and the PID for the above PMT, respectively.

Next, under the control of the PCR control unit 117, transfer of PCR is started by the PID for PCR determined at the step S13 (step S14). Subsequently, transfer of PCR is carried out with predetermined time intervals, and thus, a time can be defined on the STC time axis during decode processing of the MPEG2-TS.

Next, under the control of the PSI control unit 115, a PAT describing a program configuration is generated based on the PID for PMT determined at the step S13, and the packet transfer is started (step S15). In addition, the video component determined at the step S13 used for special reproduction, the PID for PCR, and the PMT describing the current program number are generated, they are defined as a TS packet having the PID for PMT determined at the step S13, and transfer is started (step S16).

Next, processing for determining trick VAU that is a video access unit employed for special reproduction is carried out (step S17). Here, processing for determining trick VAU at the step S17 will be specifically described with reference to the flow chart shown in FIG. 10.

Figure 10:
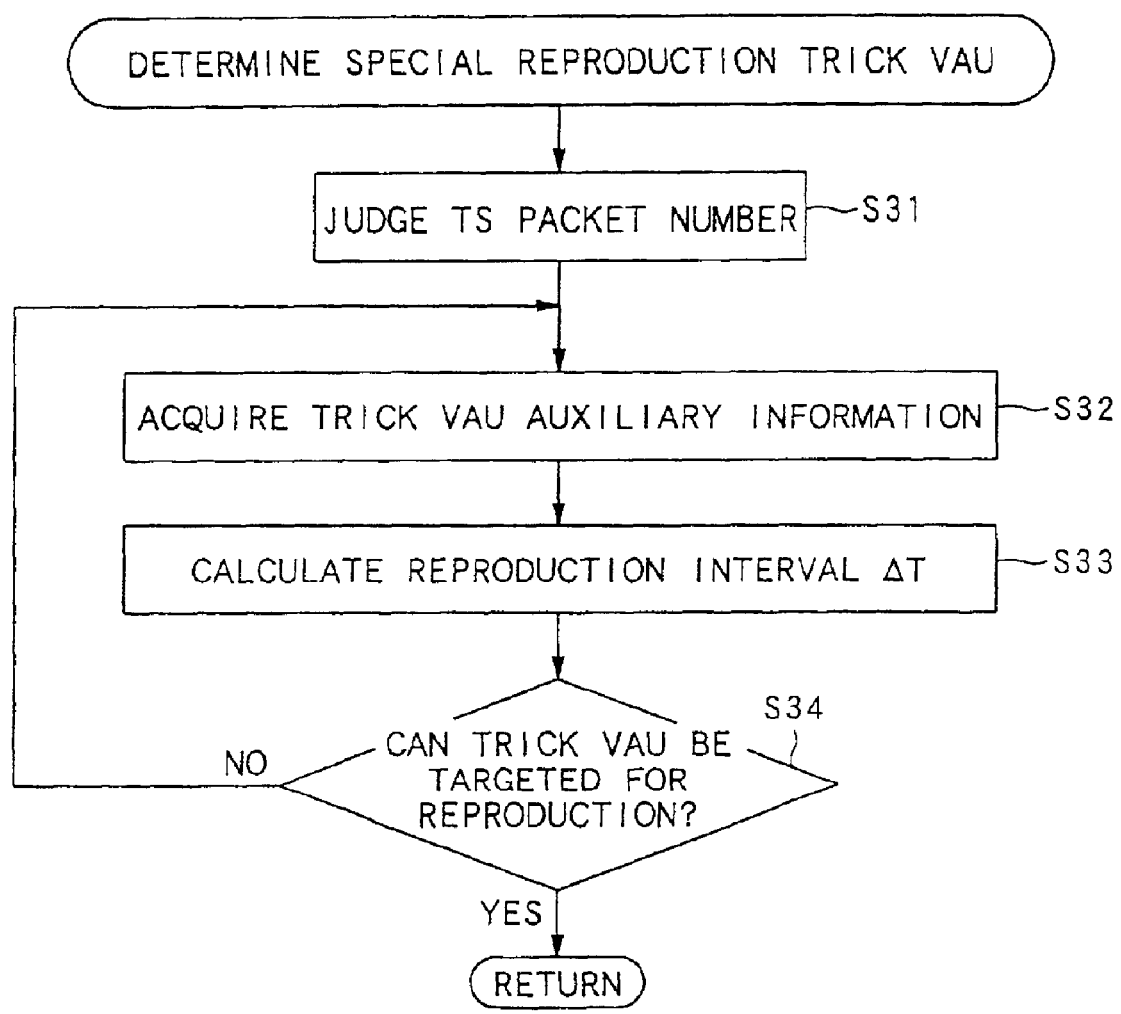
FIG. 10 is a flow chart illustrating trick VAU determination processing in special reproduction processing.

When the trick VAU determination processing shown in FIG. 10 is started, the number assigned to a TS packet employed during the current or previous reproduction processing is determined (step S31). In this manner, special reproduction can be started while a time at which transfer is stopped at the step S12 shown in FIG. 9 is defined as a reference.

Next, search for an auxiliary information recording area 3b of the storage medium 3 is carried out in order to select the next reproduction candidate based on the number determined at the step S31, and desired trick VAU auxiliary information is acquired (step S32). In the case of special reproduction, as described above, a TS packet containing the I picture is selected as a reproduction candidate. The recording position of a TS packet of the storage medium 3 can be determined based on the VAU auxiliary information acquired at the step S32. In the case where special reproduction is fast forward winding, the auxiliary information recording area 3b may be forwardly searched for. In the case where special reproduction is rewinding, the auxiliary information recording area 3b may be backwardly searched for.

Next, based on a reproduction timing of the preceding trick VAU reproduced immediately before a trick VAU as a new reproduction candidate and a reproduction timing of the trick VAU as the new reproduction candidate, a reproduction interval Δt between these timings is calculated (step S33). The reproduction interval Δt calculated at the step S33 is determined as an appropriate value depending on the conditions such as fast forward winding or rewinding steed.

Next, it is determined whether or not a trick VAU defined as a reproduction candidate, as described above, is actually targeted for reproduction based on the reproduction interval Δt calculated at the step S33 (step S34). This determination can be effected in accordance with a variety of conditions. For example, the determination can be effected depending on the conditions such as whether or not a time required for carrying out specific reproduction processing is allocated as the reproduction interval Δt or whether or not the reproduction interval Δt is within the range that the user can be visually identified. When YES is judged at the step S34, and the trick VAU targeted for reproduction is determined, processing goes to the step S18 shown in FIG. 9. On the other hand, in the case where NO is determined at the step S34, and the trick VAU cannot be targeted for reproduction, processing at the step S32 and subsequent is repeated.

Next, in FIG. 9, a PTS (Presentation Time Stamp) that corresponds to the trick VAU determined as a reproduction target at the step S17 is generated (step S18). This PTS is a time stamp that represents a decode timing and display timing of a trick VAU on the time axis of STC assigned by the PCR to be additionally transferred.

Next, processing for transferring the trick VAU determined as a reproduction target is carried out (step S19). Specific processing at the step S19 will be described later. One trick VAU corresponds to one video sequence, and is transferred to be included in a TS packet string generated at the special reproduction data trimming unit 113. Then, it is determined whether or not special reproduction processing corresponding to a special reproduction command terminates (step S20). If the determination result is negative (step S20: NO), processing returns to the step S17. When the determination result is affirmative, (step S20: YES), the processing shown in FIG. 9 is terminated.

Figure 11:
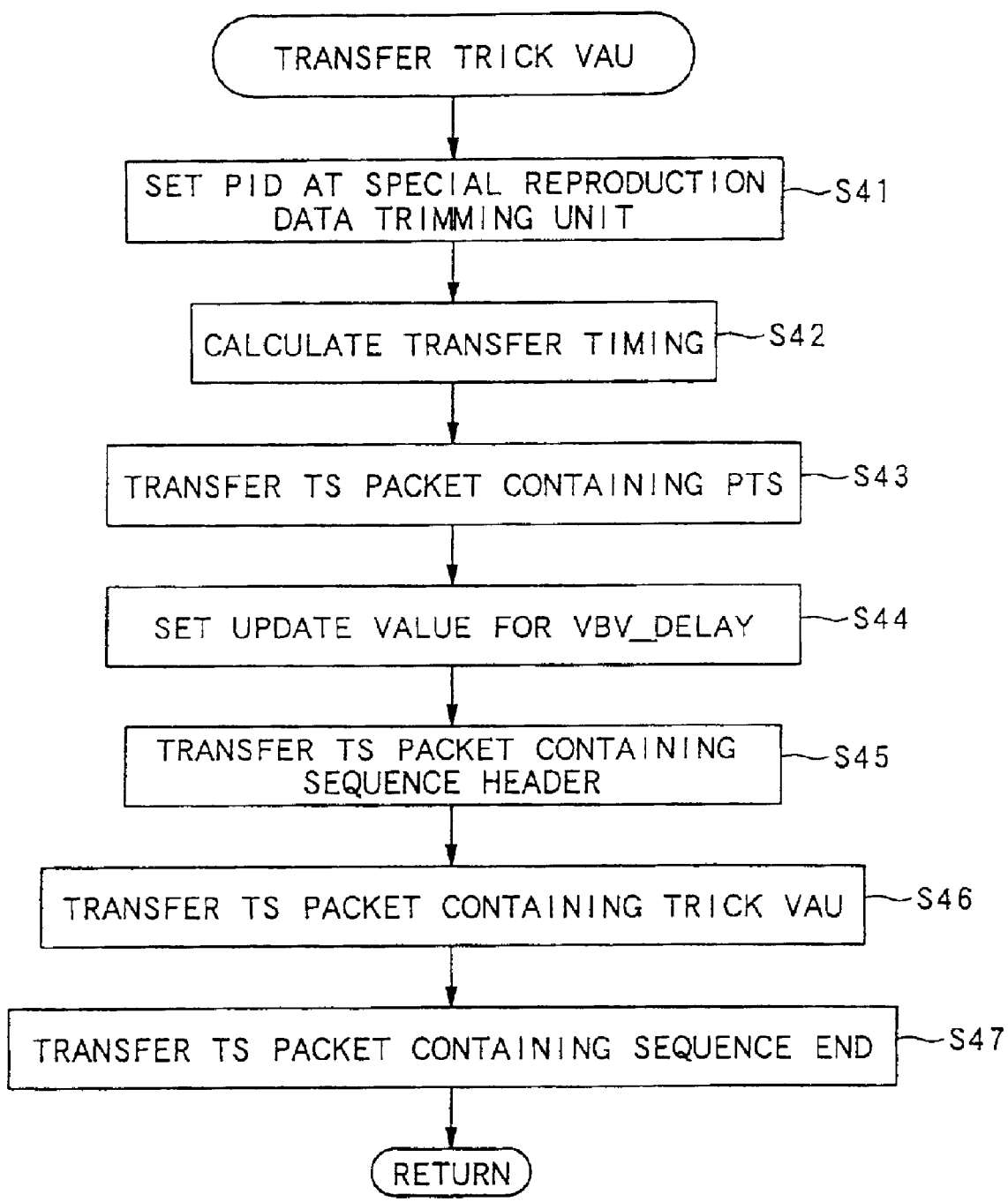
FIG. 11 is a flow chart illustrating trick VAU transfer processing in special reproduction processing.
Figure 12:
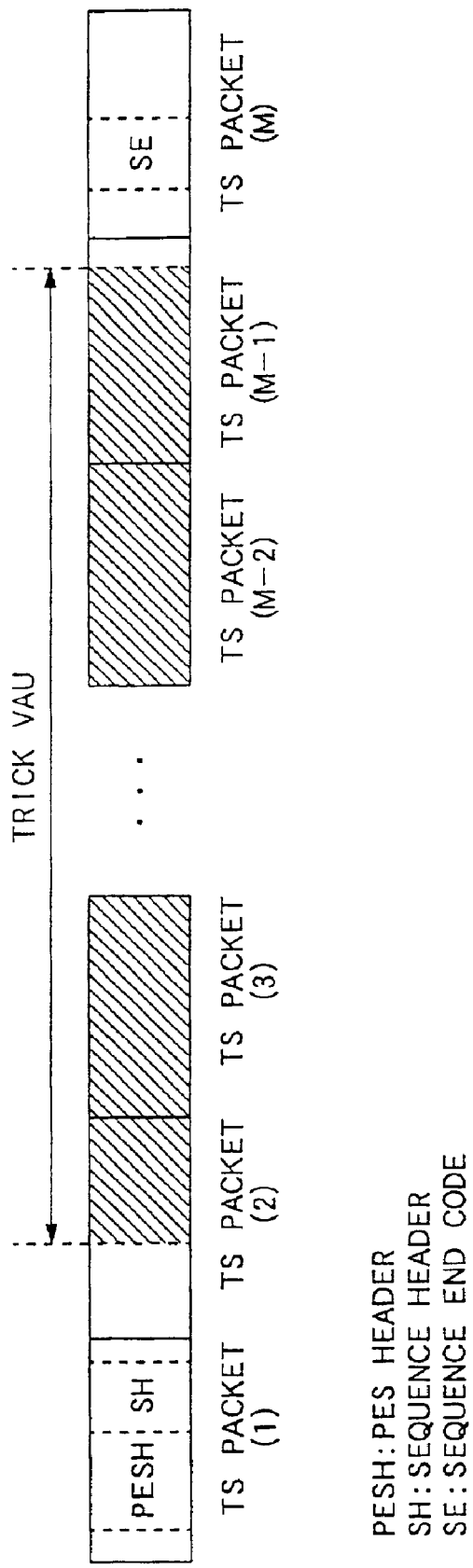
FIG. 12 is a diagram showing a specific example of a configuration of a TS packet row generated as a transfer target during trick VAU transfer processing.
Figure 13:
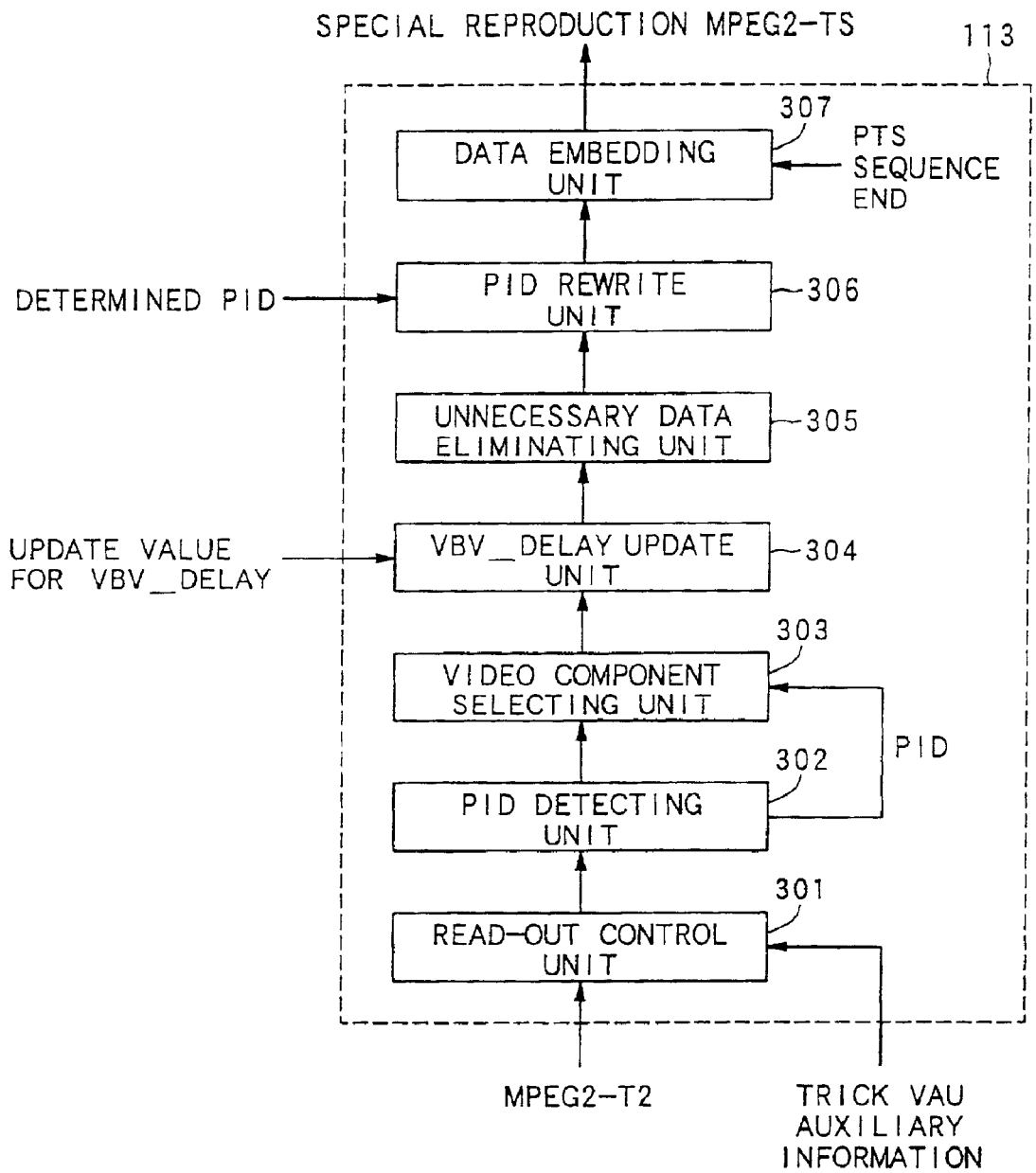
FIG. 13 is a functional block diagram showing a specific reproduction data trimming unit contained in the reproduction processing unit.

Now, processing for transferring a trick VAU at the step S19 will be specifically described with reference to FIG. 11 to FIG. 13. FIG. 11 is a flow chart showing the transfer processing at the step S19. FIG. 12 is a diagram showing a specific example of a configuration of a TS packet string generated as a transfer target at the step S19. FIG. 13 is a functional block diagram showing a special reproduction data trimming unit 113 of a reproduction processing unit 27.

First, trick VAU transfer processing will be described with reference to FIG. 11 and FIG. 12. When the processing shown in FIG. 11 is started, the PID determined at the step S13 shown in FIG. 9 is set at the special reproduction data trimming unit 113 (step S41). That is, a TS packet containing a trick VAU selected during special reproduction may have a variety of PIDs. The setting at the step S41 is provided to the special reproduction data trimming unit 113, whereby the TS packet string containing each trick VAU transferred during special reproduction is determined at the step S13 shown in FIG. 9, and is unified in a common video PID described in a PMT to be transferred.

Next, a transfer timing for transferring a packet of video sequences corresponding to a trick VAU is calculated (step 42). In the present embodiment, one video sequence configures the above described TS packet string as well as one PES packet (Packetized Elementary Stream Packet) and is transferred. That is, the components of this PES packet are divided into at a plurality of TS packets and transferred. Therefore, it is required to define scheduling for transferring individual TS packets in consideration of the respective transfer speeds or data sizes.

Next, a PES header is generated, in which the PTS generated as described above corresponding to a trick VAU is described, and a TS packet containing the generated PES header is transferred (step S43).

Here, in FIG. 12, there is shown a TS packet string for transferring a trick VAU targeted for transfer. For the sake of convenience, in FIG. 12, although a number assigned to the TS packet, it is found that one trick VAU is transferred by employing M continuous TS packets in total. Then, the above PES header (PESH) is contained in the corresponding TS packet (1) at the step S43, wherein PTS is described.

In FIG. 11, vbv-delay defined in MPEG as a parameter which provides the decode timing of each picture in a video elementary stream hierarchy, is calculated as a proper update value relevant to each trick VAU during special reproduction. Then, the update value is set at the special reproduction data trimming unit 113 (step S44). In this manner, an I picture corresponding to the trick VAU can be decoded at a timing adaptive to special reproduction.

Next, a TS packet containing a sequence header to be added at the beginning of a video sequence is transferred (step S45). In an example shown in FIG. 12, a sequence header (SH) is contained in the TS packet (1). In this case, both of the PES header and sequence header are transferred by means of the TS packet (1). In actuality, the TS packets containing them may be integrated or separated according to data arrangement.

Next, a TS packet containing a trick VAU that is a main frame of a video sequence is transferred (step S46). As shaded in FIG. 12, the data length of the TS packet is only 188 bytes, and thus, one trick VAU is divided by a number of TS packets to be transferred.

Next, a TS packet containing a sequence end code to be added at the end of a video sequence is transferred (step S45), and the processing shown in FIG. 11 is terminated. In an example shown in FIG. 12, a sequence end code (SE) is contained in the last TS packet (M).

In this way, one video sequence from a sequence header to a sequence end code via a trick VAU is transferred by employing a continuous TS packet. In addition, this video sequence is defined as a PES packet, and the PES header is added, whereby a PTS for specifying a decode timing and display timing can be set relevant to such each trick VAU.

Now, functions of the special reproduction data trimming unit 113 that plays an important role in transfer of a trick VAU, as described above, will be described here with reference to FIG. 13. As shown in FIG. 13, the special reproduction data trimming unit 113 is provided with: a read-out control unit 301; a PID detecting unit 302; a video component selecting unit 303; a vbv_delay update unit 304; an unnecessary data eliminating unit 305; a PID rewrite unit 306; and a data embedding unit 307.

In the above configuration, the read-out control unit 301 provides an access to the storage medium 3, and reads out trick VAU auxiliary information that corresponds to a special reproduction command from the auxiliary information recording area 3a. Based on the read out information, this control unit determines a recording position of the MPEG2-TS recording area 3a, and reads out predetermined recording data.

The video PID detecting unit 302 detects a PID for each trick VAU and sequence header data relevant to MPEG2-TS that is record data read out at the read-out control unit 301, and sequentially outputs the detected PID.

The video component selecting unit 303 selectively outputs a TS packet string consisting of a video component that corresponds to a predetermined PID of the above MEPG2-TS while referring to the detected PID at the video PID detecting unit 302. That is, a component unnecessary for special reproduction such as audio data or PSI data is eliminated from components each configuring the MPEG2-TS by means of the vide component selecting unit 303.

The vbv_delay update unit 304 detects a vbv_delay field of a trick VAU that corresponds to the video component selected at the video component selecting unit 303, replaces the detected field with an update value of vbv_delay obtained at the step S44, and update the value.

The unnecessary data eliminating unit 305 eliminates unnecessary data in order to generate a TS packet string shown in FIG. 12 from the TS packet strings each corresponding to the above trick VAU. That is, during special reproduction in the present embodiment, PCR and PED headers are newly generated, thus making it necessary to delete data on the PCR or PES header contained in original record data. Therefore, at this time, old data is eliminated.

The PID rewrite unit 306 sequentially rewrites PIDs of TS packets each configuring a trick VAU into a PID set at the step S41. In this manner, a TS packet string containing a trick VAU to be transferred during special reproduction is unified in a specific PID.

The data embedding unit 307 embeds a PES header at which a PTS indicating a reproduction time is described, relevant to the TS packet string that corresponding to the trick VAU, and embeds a sequence end code that consists of a predetermined bit pattern. That is, a TS packet string having the data structure shown in FIG. 12 is generated, a trick VAU is configured as one video sequence, and further, one PTS is assigned.

A transfer control method for a trick VAU transferred as the above reproduction transport stream will be described below with reference to FIGS. 14 to 17. In the embodiment, on the decoder side to which the trick VAU is transferred, timing control is performed by using a method (to be described below) to suppress delay of a display timing at the start of special reproduction.

An outline of the transfer control method for a trick VAU according to the embodiment will be described below. In the embodiment, in order to suppress delay of a display timing at the start of special reproduction, control is performed such that the trick VAU is transferred a plurality of times depending on situations. Two transfer control methods according to the embodiment are known. The first transfer control method is explained in FIGS. 14 and 15, and the second transfer control method is explained in FIGS. 16 and 17. In order to compare the first and second transfer control methods with each other, a diagram for explaining a case in which the transfer control methods according to this embodiment are not applied is shown in FIG. 18.

Figure 14:
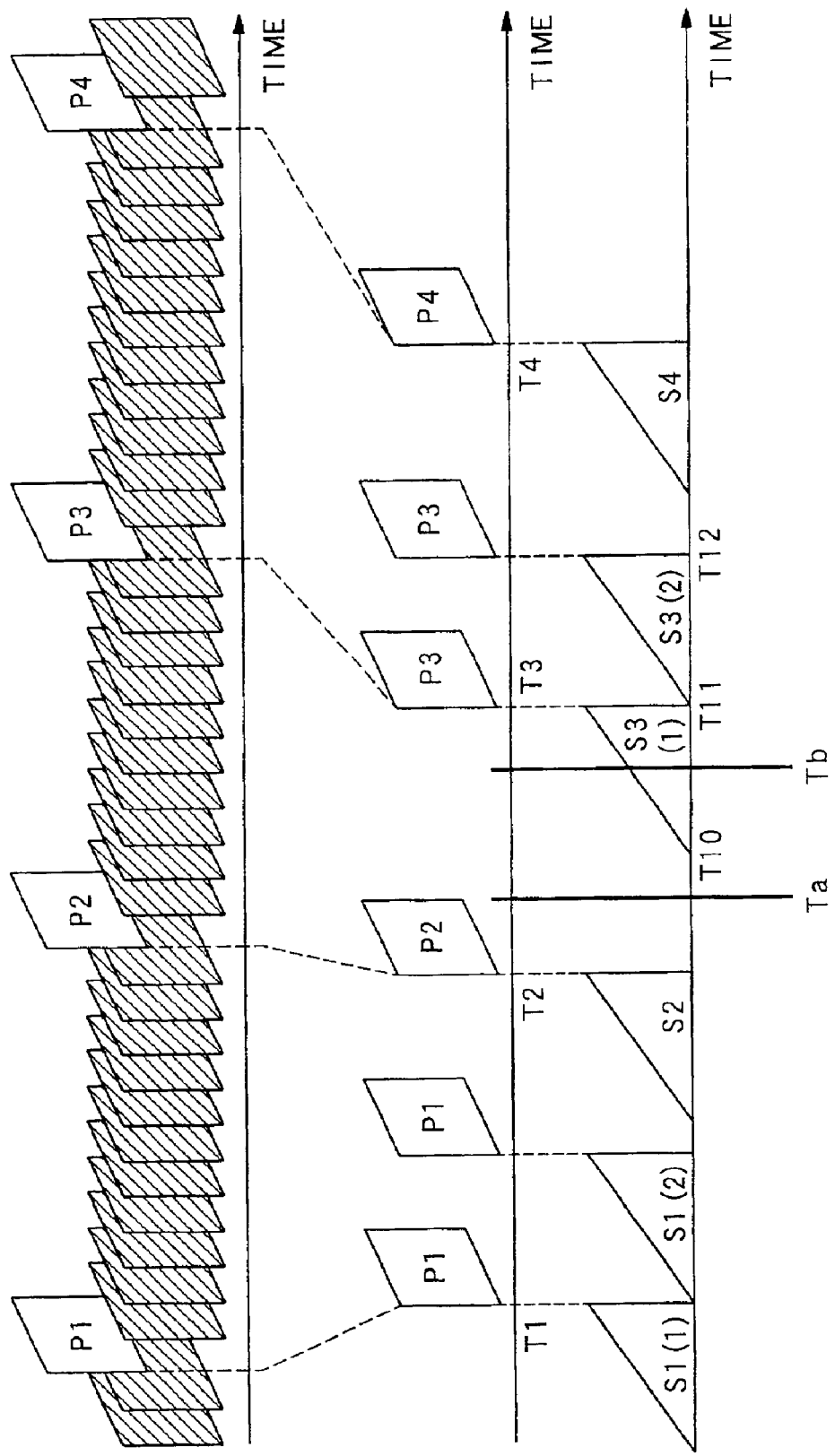
FIG. 14 is a diagram for typically explaining a first transfer control method according to the embodiment.
Figure 16:
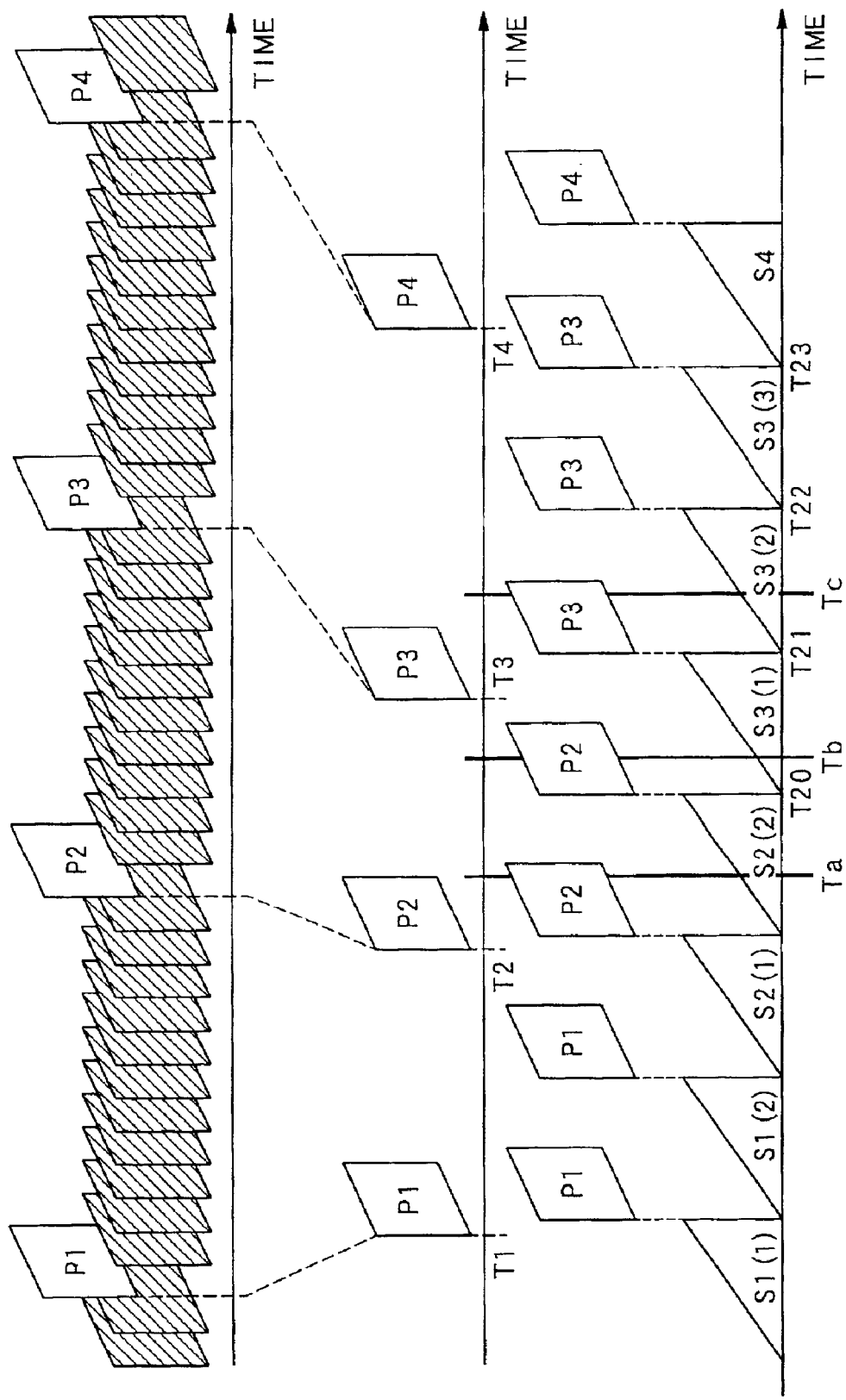
FIG. 16 is a diagram for typically explaining a second transfer control method according to the embodiment.
Figure 18:
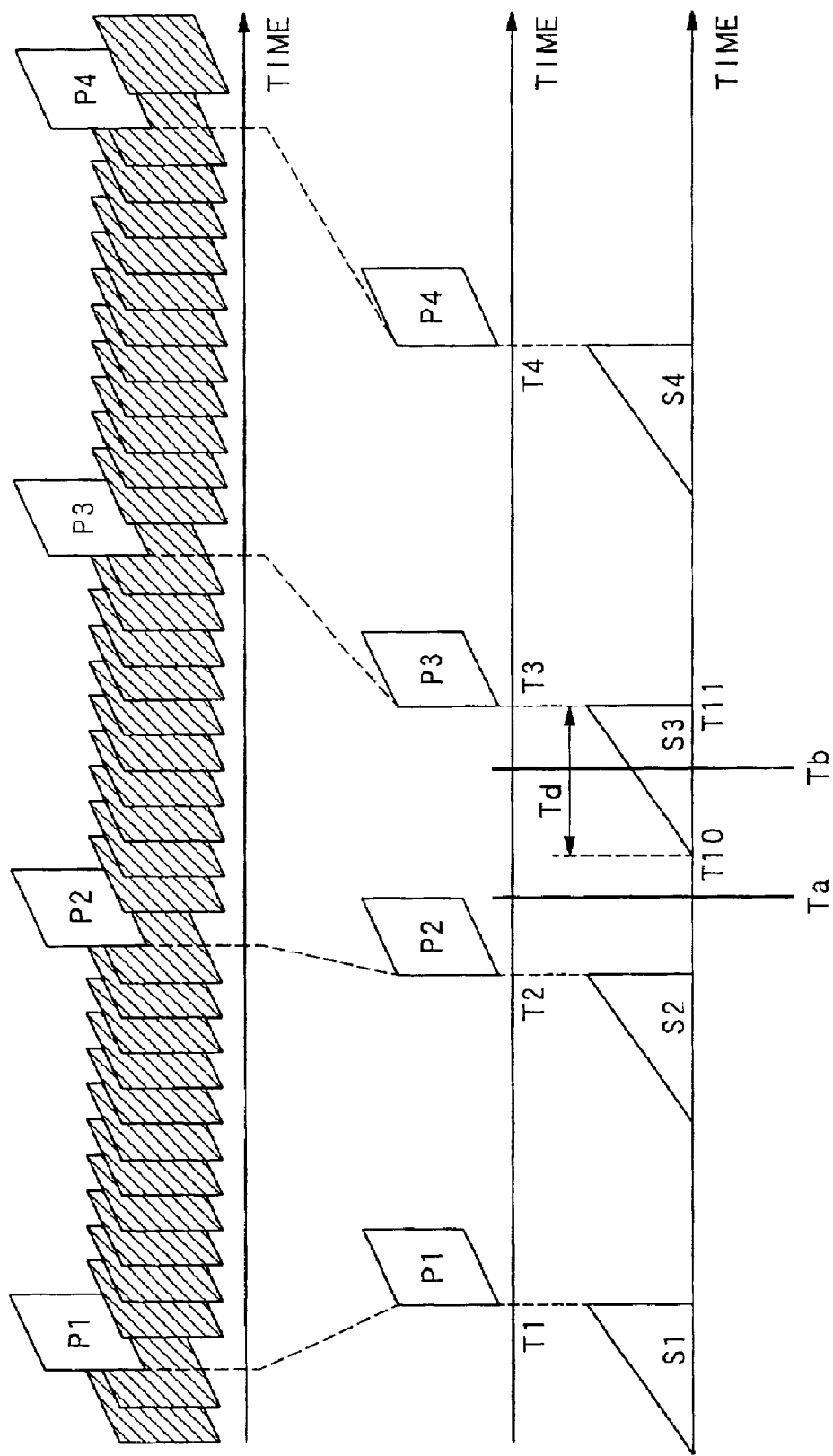
FIG. 18 is a diagram for explaining a transfer operation performed when the first and second transfer control methods according to the embodiment.

Upper parts of FIGS. 14, 16, and 18 show picture generation timings of original frame image data along time axes. More specifically, for example, when 30 frames per second, one picture data are sequentially generated for respective frames. For this reason, a picture data string arranged at intervals of 1/30 second. Objects to be reproduced as trick VAUs in special reproduction correspond to I pictures included in a picture data string. In FIGS. 14, 16, and 18, the objects are shown as pictures P1 to P4.

A transfer operation when the transfer control methods according to this embodiment are not applied will be described with reference to FIG. 18. As indicated by the central portion in FIG. 18, for the pictures P1 to P4 in the special reproduction, display timings T1 to T4 are set on the time axis. The display timings T1 to T4 are determined on the basis of a PTS added by the reproduction process unit 27. Timings at the pictures P1 to P4 should be displayed are regulated in accordance with the contents of the special reproduction. In the example in FIG. 18, the display timings T1 to T4 of the pictures P1 to P4 are set at time intervals which are shorter than that of an original frame image.

As indicated by the lower part in FIG. 18, transfers S1 to S4 for the pictures P1 to P4 are indicated by triangles. The triangles express manners in which amounts of transfer data gradually increase from the starts of the transfers of the pictures P1 to P4 to the end of the transfers. In this case, as in case of the picture P3, the width of the triangle corresponds to a time interval Td from a timing T10 of the start of the transfer to a timing T11 of the end of the transfer. As shown in FIG. 18, the timing T11 is set at a timing which is accurately equal to the display timing T3. More specifically, the display timing T3 of the picture P3 is discriminated, and a timing being ahead by only a time interval Td required for a transfer operation or the like for a trick VAU is set as a timing T10. Actually, after the timing T11 of the completion of the transfer, some delay up to the display timing T3 is caused by a decoding process or the like on the decoder side. However, the delay is so small that the delay can be neglected with respect to the time interval Td.

In FIG. 18, when a decode start instruction is output at a timing Ta, the picture P3 which begins to be transferred at the timing T10 can be received on the decoder side. For this reason, the picture P3 can be displayed at the display timing T3 for the first time. On the other hand, when a decode start instruction is output at the timing Tb, the picture P3 cannot be received at the timing T10 on the decoder side. For this reason, the picture P4 subsequent to the picture P3 is a picture which is displayed for the first time. As a result, depending on the timing at which the decode start instruction is outputted, a blank period until the special reproduction is displayed is disadvantageously long.

In contrast to this, in the first transfer control method according to the embodiment shown in FIG. 14, pictures are allowed to be transferred twice or more as needed in special reproduction to avoid the above drawbacks. In the example in FIG. 14, it is understood that each of the picture P1 and picture P3 is continuously transferred twice (in FIG. 14, numbers in parentheses following the transfers S1 and S3 indicate the numbers of times of the transfers S1 and S3). In this manner, in the first transfer control method, when a specific picture whose transfer is completed is continuously transferred, by using a condition that a timing of the completion of transfer the time interval Td after the timing of the start of transfer (timing at which a picture can be displayed) is set before a timing of the start of transfer of the next picture has passed, the picture is controlled to be repeatedly transferred a large number of times.

Figure 15:
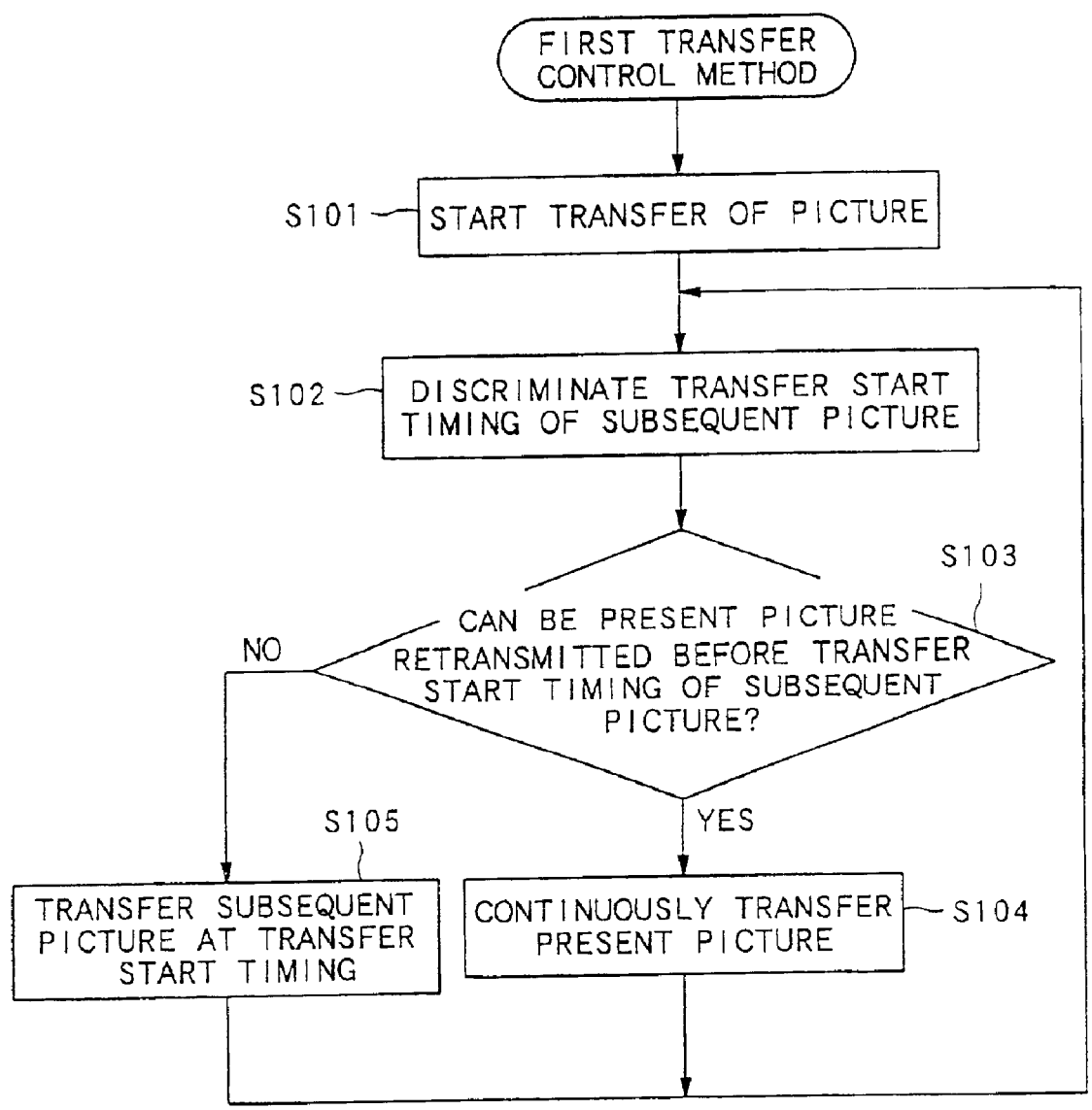
FIG. 15 is a flow chart illustrating the flow of processes performed by the first transfer control method.

FIG. 15 is a flow chart showing the flow of processes performed by the first transfer control method. In FIG. 15, a predetermined picture selected as a trick VAU begins to be transferred (step S101). A transfer start timing of a subsequent picture corresponding to the next trick VAU is discriminated (step S102). More specifically, a timing being ahead by only the time interval Td from a display timing set for the subsequent picture may be used as a transfer start timing.

The transfer start timing of the subsequent picture discriminated in step S102 is compared with a transfer completion timing (timing at which the time interval Td is elapsed from the transfer completion timing of a present transfer operation), so that it is determined whether the present picture can be retransmitted until a transfer start timing of the subsequent picture or not (step S103). As a result, if it is determined that the transfer completion timing when the present picture is retransmitted is set before the transfer start timing of the subsequent picture has passed (step S103; YES), transfer is started after the completion of transfer of the present picture (step S104). When step S104 is completed, the control returns to step S102 to repeat the same processes as described above.

On the other hand, if it is determined that the transfer completion timing when the present picture is retransmitted is set after the transfer start timing of the subsequent picture has passed (step S103; NO), upon completion of transfer of the present picture, transfer of the subsequent picture is started at the transfer start timing discriminated in step S102 (step S105). When the process in step S105 is finished, the control flow returns to step S102 to repeat the same processes as described above.

A case using the picture P3 in FIG. 14 will be exemplified. The first transfer S3 (1) is performed in a period from the timing T10 to the timing T11, and the second transfer S3 (2) is started at the timing T11 and performed until the timing T12. If a decode start instruction is outputted at the same timings Ta and Tb as in FIG. 18, the picture P3 can be displayed at the timing T11 which is the same as that in FIG. 18. On the other hand, if the decode start instruction is outputted at the timing Tb, the picture P3 can be displayed at the timing T12. This case is different form the example in FIG. 18.

More specifically, when the decode start instruction is outputted at the timing Tb, in the example in FIG. 18, due to restriction caused by the time interval Td of the transfer S3 (1) of the picture P3, the next picture P4 must be displayed. In contrast to this, in the example in FIG. 14, since the transfer S3 (2) is subsequent to the transfer S3 (1) of the picture P3, the picture P3 can be displayed. In the example in FIG. 18, after the start of special reproduction, unlike the example in FIG. 18, the display of the picture P3 need not be waited until the display timing T4, and the preceding picture P3 can be displayed at the timing T12 earlier than the timing T4. The timing T12 is backwardly offset from the original display timing T3 of the picture P3. However, since it is consistent that the display image at this timing corresponds to the picture P3, a person who watches this image does not feel incompatibility.

In this manner, the first transfer control method according to the embodiment has such an excellent point that a blank period from when special reproduction is started to when a picture is displayed can be shortened to rapidly start a display. In the example in FIG. 14, the case in which pictures are transferred twice. However, when the transfer is completed before the transfer start timing of the next picture has passed, the number of times of transfer of pictures is not limited to a specific value.

The second transfer control method for display timing control in the embodiment is equal to the first transfer control method in that pictures are transferred twice or more as needed in special reproduction, but the second transfer control method is different from the first transfer control method in conditions for transfer timings. As shown in FIG. 16, the frequency of transfer of pictures in the second transfer control method is higher than that in the first transfer control method. In the second transfer control method, when a specific picture whose transfer is completed is continuously transferred, by using a condition that a timing at which the transfer is completed (timing at which the pictures can be displayed) is set before a display timing set for the next picture has passed, control is performed such that the picture is repeatedly transferred a large number of times.

Figure 17:
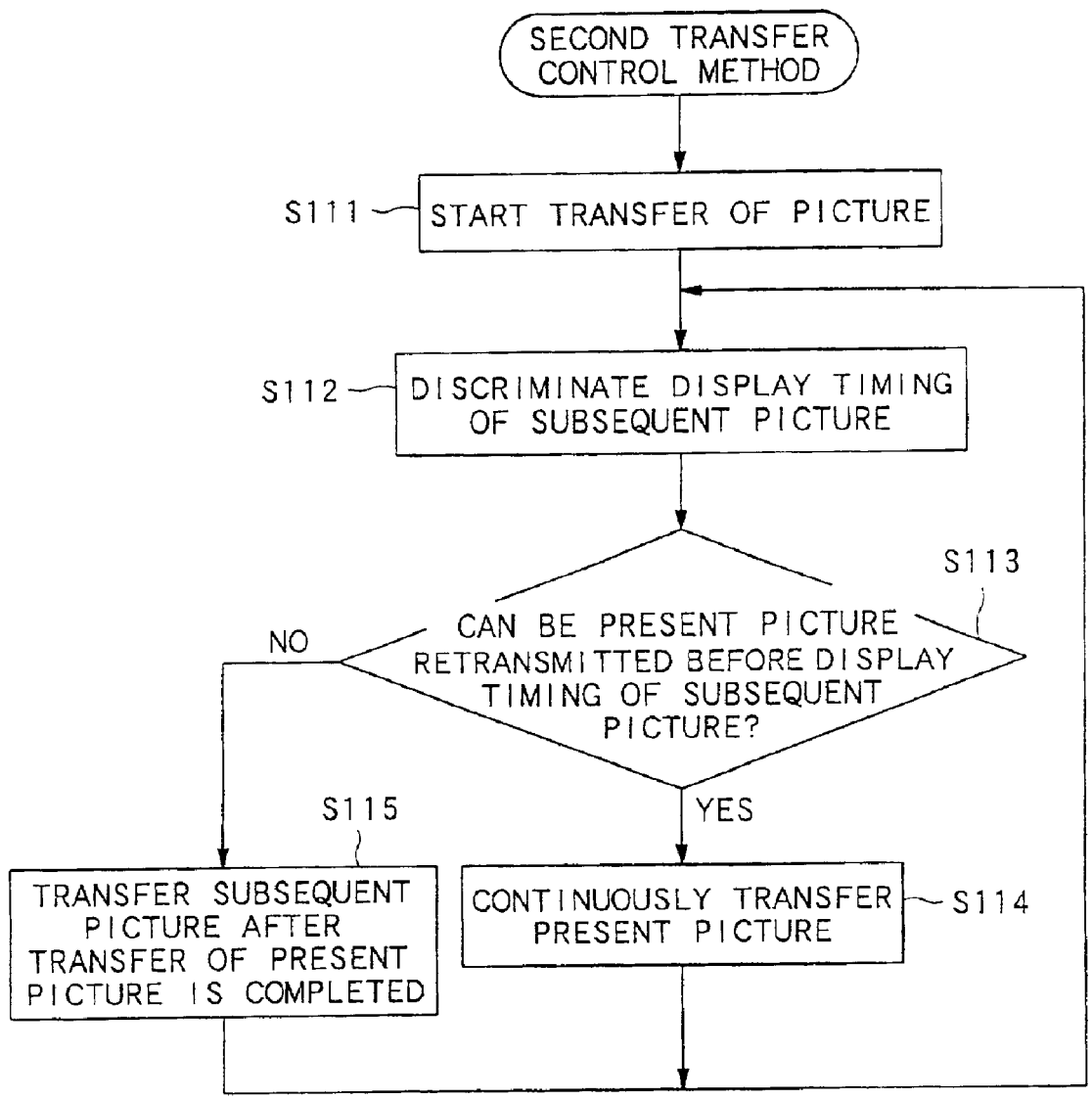
FIG. 17 is a flow chart illustrating the flow of processes performed by the second transfer control method.

FIG. 17 is a flow chart showing the flow of processes performed by the second transfer control method. In FIG. 17, transfer of a predetermined picture selected as a trick VAU is started (step S111). A display timing set for the subsequent picture corresponding to the next trick VAU is discriminated (step S112).

The display timing of the subsequent picture discriminated in step S112 is compared with a transfer completion timing (timing at which the time interval Td is elapsed from the transfer completion timing of a present transfer operation), so that it is determined whether the present picture can be retransmitted until a display timing of the subsequent picture or not (step S113). As a result, the transfer completion timing when the present picture is retransmitted is set before the display timing of the subsequent picture has passed (step S113; YES), transfer is started after the completion of transfer of the present picture (step S114). When step S114 is completed, the control returns to step S112 to repeat the same processes as described above.

On the other hand, if the transfer completion timing when the present picture is retransmitted is set after the display timing of the subsequent picture has passed (step S113; NO), upon completion of transfer of the present picture, transfer of the subsequent picture is started (step S115). At this time, when the transfer start timing corresponding to the display timing of the subsequent picture has passed, transfer of the subsequent picture is started at the transfer completion timing of the present picture. For this reason, the display timing of the subsequent picture is consequently delayed. When the process in step S115 is finished, the control flow returns to step S112 to repeat the same processes as described above.

A case using the picture P3 in FIG. 16 will be exemplified. The first transfer S3 (1) is started at a timing T20 and performed until a timing T21, the second transfer S3 (2) is started at the timing T21 and performed until the timing T22, and the third transfer S3 (3) is started at the timing T22 and performed until a timing T23. In FIG. 16, it is assumed that a decode start instruction is outputted at the same timings Ta and Tb as in FIGS. 14 and 18, and that a decode start instruction is outputted at a subsequent timing Tc.

When the decode start instruction is outputted at the timing Ta, the picture P3 can be displayed at the timing T21. In FIG. 16, the timing T21 at which the picture P3 can be displayed for the first time is set to be a timing slightly offset from the timing T11 in the example in FIG. 14. This is based on that the timing T20 at which the transfer S3 (1) of the picture P3 is started is backwardly shifted in point of time by the second transfer S2 (2) of the picture P2 performed prior to the transfer S3 (1). When the decode start instruction is outputted at the timing Tb, the picture P3 can be displayed at the timing T22 in FIG. 16. As described above, the timing T22 is slightly offset from the timing T12 in FIG. 14.

Even though the decode start instruction is outputted at the timing Tc, unlike the first transfer control method in FIG. 14, as shown in FIG. 16, the third transfer S3 (3) of the picture P3 is performed. For this reason, the picture P3 can be displayed. More specifically, in FIG. 16, at the timing T22 at which the third transfer S3 (3) is started, it is determined that the transfer completion timing T23 is set before the display timing T4 of the picture P4 has passed. For this reason, the third transfer S3 (3) is performed.

In the second transfer control method, when a specific picture whose transfer is completed is continuously transferred, the frequency of transfer of pictures is increased such that the display timing and the transfer start timing of the subsequent picture are allowed to be delayed to some extent. As indicated by the lower part in FIG. 16, it is apparent that the pictures P1 to P4 are continuously transferred without intermissions. Therefore, after the decode start instruction is outputted, a possibility that a specific picture can be displayed more increases, and a blank period until special reproduction begins to be displayed can be more shortened. In the second transfer control method, a possibility that the original display timings of any pictures are slightly delayed increases with transfer of preceding pictures. However, since the delays fall within the range of the time interval Td at the most, a person who watches a reproduced image is scarcely influenced.

In this manner, the second transfer control method according to the embodiment has the following excellent point. That is, the frequency of transfer of pictures is increased, a blank period from the start of special reproduction until a display is performed can be more shortened, and the display can be more rapidly started.

In transfer control, a method in which the first and second transfer control methods are switched to each other with the elapse of time will be described below. As has been described above, the first or second transfer control method is more excellent than a conventional method in that a blank period until the first picture begins to be displayed immediately after reproduction is started can be shortened. However, in a state in which a predetermined period of time is elapsed to advance reproduction, the conventional method may be used. The first transfer control method and the second transfer control method are different from each other in, as described above, conditions such as the advantages of shortening blank periods, matching between display timings of these methods and an original display timing, and transmission data rates. Therefore, in transfer control, when the three methods, i.e., the first control method, the second control method, and the conventional method are used such that these methods are switched with the elapse of time, the transfer control can be optimized depending on reproduction conditions.

As a concrete example of the transfer control, control can be performed such that the first or second transfer control method is set at the start of reproduction, and is changed into the conventional method after a predetermined period of time is elapsed. In this manner, at the start of reproduction, transfer is performed by using the first or second transfer control method which is effective to shorten the blank period. After the transfer operation is stabled, transfer is performed by using the conventional method which requires a low transmission data rate, so that efficient control is performed.

As another concrete example of the transfer control, the following control can be performed. That is, the second transfer control method is set at the start of reproduction, the second transfer control method is changed into the first transfer control method after a predetermined period of time is elapsed, and the first transfer control method is changed into the conventional method after another predetermined period of time is elapsed. More specifically, the second transfer control method, the first transfer control method, and the conventional method are in order of the degrees of shortening of blank periods and transmission data rates. Control is performed such that the switching methods are switched in accordance with the order. Therefore, a rapid display process is performed on the initial stage of the transfer control, and a transmission data rate is suppressed with the elapse of time, so that more efficient control is performed.

In the embodiment described above, the case in which the method according to the present invention is realized in a storage and reproduction system for storing and reproducing a transport stream subjected to compression-coding by the MPEG2 scheme is described. However, the present invention is not limited to the embodiment, and the present invention can be widely applied to a case in which the method is realized in various schemes or systems which treat coded data.

The invention may be embodied in other specific forms without departing from the spirit or essential characteristics thereof. The present embodiments are therefore to be considered in all respects as illustrative and not restrictive, the scope of the invention being indicated by the appended claims rather than by the forgoing description and all changes which come within the meaning and range of equivalency of the claims are therefore intended to be embraces therein.

The entire disclosure of Japanese Patent Application No. 2000-300777 filed on Sep. 29, 2000 including the specification, claims, drawings and summary is incorporated herein by reference in its entirety.

What is claimed is:

1. A coded data transfer control method which transfers coded data to a decoding device by every access unit, which is a unit of access in reproduction, and controls transfer operations such that the timings of said transfer operations are appropriate to display timings respectively set for the access units, the method comprising the processes of:

determining a timing at which a transfer operation is to be completed when a predetermined access unit is continuously transferred after the predetermined access unit is to be transferred; and repeatedly transferring the predetermined access unit to the decoding device if the determined timing is before a timing at which a transfer operation corresponding to the display timing set for a subsequent access unit is to be started.

2. A coded data transfer control method which transfers coded data to a decoding device by every access unit, which is a unit of access in reproduction, and controls transfer operations such that the timings of said transfer operations are appropriate to display timings respectively set for the access units, the method comprising the processes of:

determining a timing at which a transfer operation is to be completed when a predetermined access unit is continuously transferred after the predetermined access unit is to be transferred; and repeatedly transferring the predetermined access unit to the decoding device if the determined timing is before the display timing set for a subsequent access unit.

3. The coded data transfer control method according to claim 1, wherein said process of repeatedly transferring the predetermined access unit includes a process of reading an access unit to be transferred from a storage device in which the coded data is stored, and transfers the access unit to the decoding device.

4. The coded data transfer control method according to claim 3, wherein said process of repeatedly transferring the predetermined access unit includes a process of selectively determining the access unit to be transferred on the basis of auxiliary information including recording position information of the access unit in the storage device.

5. The coded data transfer control method according to claim 4, wherein, when a reproduction command for a predetermined reproduction condition is received, said process of repeatedly transferring the predetermined access unit transfers the access unit in form of a reproduction transport stream with control information.

6. The coded data transfer control method according to claim 5, wherein said process of repeatedly transferring the predetermined access unit includes a process of adding the control information to the reproduction transport stream, wherein the control information includes time reference information of a program included in the transport stream and reproduction time information for regulating time at which the access unit to be reproduced.

7. A storage and reproduction system which performs a storage process and a reproduction process of a transport stream on which coded data is multiplexed, the system comprising:

a storage device for storing coded data;

a timing determining device for determining a timing at which a transfer operation is to be completed when a predetermined access unit is continuously transferred after the predetermined access unit is to be transferred; and a transferring device for repeatedly transferring the predetermined access unit to a decoding device if the determined timing is before a timing at which a transfer operation corresponding to the display timing set for a subsequent access unit is to be started, wherein said transferring device comprises:

an access unit determining device for determining the access unit to be transferred on the basis of auxiliary information including recording position information of the access unit in the storage device;

a reading device for reading an access unit to be transferred from the storage device in which the coded data is stored; and a generating device for generating a reproduction transport stream including a plurality of the read access unit with control information.

8. The storage and reproduction system according to claim 7, wherein said transferring device further comprises an adding device for adding the control information to the reproduction transport stream, wherein the control information includes time reference information of a program included in the transport stream and reproduction time information for regulating time at which the access unit to be reproduced.

* * * * *